US010641243B2

(12) United States Patent
Yañez Villarreal

(10) Patent No.: US 10,641,243 B2
(45) Date of Patent: May 5, 2020

(54) ELECTRICAL POWER GENERATOR HARNESSING A SWAYING MOVEMENT OF A POLE AND INCLUDING A SYSTEM FOR GENERATING A MAGNETIC REPULSION FORCE

(71) Applicant: VORTEX BLADELESS, S.L., Madrid (ES)

(72) Inventor: David Jesús Yañez Villarreal, Ávila (ES)

(73) Assignee: VORTEX BLADELESS, S.L., Madrid (ES)

( * ) Notice: Subject to any disclaimer, the term of this patent is extended or adjusted under 35 U.S.C. 154(b) by 0 days.

(21) Appl. No.: 15/506,650

(22) PCT Filed: Oct. 2, 2015

(86) PCT No.: PCT/EP2015/072802
§ 371 (c)(1),
(2) Date: Feb. 24, 2017

(87) PCT Pub. No.: WO2016/055370
PCT Pub. Date: Apr. 14, 2016

(65) Prior Publication Data
US 2017/0284365 A1    Oct. 5, 2017

(30) Foreign Application Priority Data

Oct. 6, 2014   (EP) ..................................... 14382381
May 28, 2015   (EP) ..................................... 15169713

(51) Int. Cl.
*F03D 5/06*    (2006.01)
*H02K 35/02*   (2006.01)
(Continued)

(52) U.S. Cl.
CPC ................. *F03D 5/06* (2013.01); *H02K 7/09* (2013.01); *H02K 35/02* (2013.01); *H02N 2/185* (2013.01);
(Continued)

(58) Field of Classification Search
CPC . F03D 5/06; H02K 35/02; H02K 7/09; H02N 15/00; H02N 2/181; H02N 2/185; Y02E 10/70
See application file for complete search history.

(56) References Cited

U.S. PATENT DOCUMENTS 5,783,885 A * 7/1998 Post ...................... F16C 39/063
                                              310/103
6,651,511 B1 * 11/2003 Young ...................... G01F 1/20
                                              73/861.08
(Continued)

FOREIGN PATENT DOCUMENTS

CN    201818437 U    5/2011
CN    203056815 U    7/2013
(Continued)

OTHER PUBLICATIONS

H M Warui et al. "Feedback Control of Vortex Shedding From a Circular Cylinder by Cross-Flow Cylinder Oscilations" Experiments in Fluids, May 1, 1996, vol. 21, No. 1, pp. 49-56.
(Continued)

*Primary Examiner* — Tulsidas C Patel
*Assistant Examiner* — S. Mikailoff
(74) *Attorney, Agent, or Firm* — Cantor Colburn LLP

(57) ABSTRACT

An electrical power generator includes a first part configured to be located in a fluid such that, when the fluid moves, it generates vortices in the fluid so that a lift force is generated on the first part, which produces an oscillating movement of the first part, which has an amplitude. The natural oscillation
(Continued)

frequency of the first part may be adjusted to wind speed by way of magnets, which repel each other. Magnets may also be used to generate electrical currents in coils. The first part can have a diameter that increases with distance above the base of the generator.

16 Claims, 15 Drawing Sheets

(51) Int. Cl.
*H02K 7/09* (2006.01)
*H02N 2/18* (2006.01)
*H02N 15/00* (2006.01)
*H01F 7/02* (2006.01)

(52) U.S. Cl.
CPC ............ *H01F 7/0236* (2013.01); *H02N 2/181* (2013.01); *H02N 15/00* (2013.01); *Y02E 10/70* (2013.01)

(56) References Cited

U.S. PATENT DOCUMENTS

| | | | | | |
|---|---|---|---|---|---|
| 6,831,374 | B2* | 12/2004 | Seki | ............ | F03D 3/02 290/42 |
| 6,876,094 | B2* | 4/2005 | Jacobsen | ............ | F02B 63/04 290/1 R |
| 7,199,480 | B2* | 4/2007 | Fripp | ............ | E21B 41/0085 290/1 R |
| 7,208,845 | B2* | 4/2007 | Masters | ............ | H02K 7/1892 290/1 R |
| 7,224,077 | B2* | 5/2007 | Allen | ............ | F03D 5/00 290/1 R |
| 7,462,950 | B2* | 12/2008 | Hu | ............ | F16C 39/066 290/44 |
| 7,626,281 | B2* | 12/2009 | Kawai | ............ | F03D 5/06 290/1 R |
| 7,812,466 | B2* | 10/2010 | Lu | ............ | H02N 2/188 290/1 R |
| 8,497,595 | B1* | 7/2013 | Petner | ............ | F03D 5/06 290/55 |
| 8,970,072 | B2* | 3/2015 | Headstrom | ............ | A61C 17/221 310/15 |
| 9,024,487 | B1* | 5/2015 | Reif | ............ | B60L 13/04 310/12.09 |
| 9,444,372 | B2* | 9/2016 | Yanez Villarreal | ....... | F03D 5/06 |
| 9,856,854 | B2* | 1/2018 | Yanez Villarreal | ....... | F03D 5/06 |
| 10,287,854 | B2* | 5/2019 | Jaaskelainen | ............ | E21B 47/16 |
| 2003/0234585 | A1 | 12/2003 | Tu et al. | | |
| 2005/0230973 | A1* | 10/2005 | Fripp | ............ | E21B 41/0085 290/1 R |
| 2005/0230974 | A1* | 10/2005 | Masters | ............ | H02K 7/1892 290/1 R |
| 2006/0064972 | A1* | 3/2006 | Allen | ............ | F03D 5/00 60/369 |
| 2007/0176430 | A1* | 8/2007 | Hammig | ............ | F03B 17/06 290/54 |
| 2007/0205854 | A1* | 9/2007 | Kazadi | ............ | F16C 32/0429 335/306 |
| 2008/0042504 | A1* | 2/2008 | Thibodeau | ............ | F16C 32/0436 310/90.5 |
| 2008/0048455 | A1* | 2/2008 | Carney | ............ | F03D 5/00 290/54 |
| 2008/0174119 | A1* | 7/2008 | Hu | ............ | F16C 39/066 290/55 |
| 2008/0277941 | A1* | 11/2008 | Bowles | ............ | E21B 41/0085 290/54 |
| 2008/0292467 | A1* | 11/2008 | Borgen | ............ | B63H 13/00 416/244 R |
| 2010/0237719 | A1* | 9/2010 | Hadas | ............ | H02K 35/04 310/38 |
| 2010/0306934 | A1* | 12/2010 | Headstrom | ............ | A61C 17/221 15/22.2 |
| 2012/0211990 | A1* | 8/2012 | Davey | ............ | F03B 13/264 290/54 |
| 2013/0119826 | A1* | 5/2013 | Yanez Villarreal | ....... | F03D 5/06 310/339 |
| 2014/0175800 | A1* | 6/2014 | Thorp | ............ | F03D 9/002 290/55 |
| 2015/0200582 | A1* | 7/2015 | Headstrom | ............ | A61C 17/221 310/25 |
| 2016/0013737 | A1* | 1/2016 | Yanez Villarreal | ....... | F03D 5/06 310/339 |
| 2016/0356264 | A1* | 12/2016 | Yanez Villarreal | ....... | F03D 5/06 |
| 2017/0179805 | A1* | 6/2017 | Lu | ............ | H02K 41/031 |
| 2017/0207730 | A1* | 7/2017 | Takao | ............ | F03D 5/06 |
| 2017/0268483 | A1* | 9/2017 | Kim | ............ | F03D 5/06 |
| 2017/0284365 | A1* | 10/2017 | Yanez Villarreal | ....... | F03D 5/06 |
| 2019/0101100 | A1* | 4/2019 | Yanez Villareal | ........ | F03G 7/00 |

FOREIGN PATENT DOCUMENTS

| | | | | |
|---|---|---|---|---|
| DE | 495303 | C * | 4/1930 | ............... F03D 9/25 |
| DE | 202010010431 | U1 | 9/2010 | |
| EP | 2602483 | A1 | 6/2013 | |
| FR | 2922607 | A1 | 4/2009 | |
| JP | 2001157433 | A * | 6/2001 | |
| JP | 2002281727 | A | 9/2002 | |
| JP | 2006132397 | A | 5/2006 | |
| JP | 2006158113 | A | 6/2006 | |
| JP | 2006226221 | A | 8/2006 | |
| JP | 2010279145 | A | 12/2010 | |
| JP | 2011050245 | A | 3/2011 | |
| JP | 2012151982 | A | 8/2012 | |
| JP | 2012151985 | A | 8/2012 | |
| KR | 20100023087 | A | 3/2010 | |
| WO | 9831090 | A1 | 7/1998 | |
| WO | 2006055393 | A2 | 5/2006 | |
| WO | 2010043617 | A2 | 4/2010 | |
| WO | 2012017106 | A1 | 2/2012 | |
| WO | 2012066550 | A1 | 5/2012 | |
| WO | 2014135551 | A1 | 9/2014 | |

OTHER PUBLICATIONS

International Search Report dated May 3, 2016 re: Application No. PCT/EP2015/072802; pp. 1-7.

Jo Hoonhee et al. "Stabilization of a 1/3-order subharmonic resonance using nonlinear dynamic vibration absorber" Nonlinear Dynamics, Aug. 21, 2009, vol. 59, No. 4, pp. 747-758.

Written Opinion dated May 3, 2016 re: Application No. PCT/EP2015/072802; pp. 1-10.

* cited by examiner

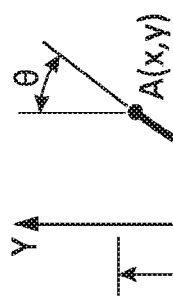
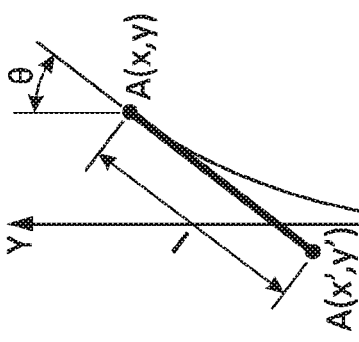
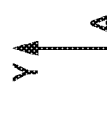
FIG. 13A
FIG. 13B
FIG. 13C
FIG. 13D

ELECTRICAL POWER GENERATOR HARNESSING A SWAYING MOVEMENT OF A POLE AND INCLUDING A SYSTEM FOR GENERATING A MAGNETIC REPULSION FORCE

TECHNICAL FIELD

The disclosure pertains to the field of renewable energy and more specifically, to the field of electrical power generation based on the motion of a fluid, from vortices generated in the fluid.

BACKGROUND

Owing to the drawbacks of non-renewable energies, such as those based on the combustion of fossil fuels or nuclear energy, major efforts have been made to develop what are known as renewable energies, amongst which those based on the use of the motion of a fluid to drive an electrical power generator are found. For example, devices known as multi-blade aerogenerators exist, which make use of the wind to rotate the rotor of an electric generator. However, these aerogenerators, which have had great success worldwide and, in many countries, produce a major share of the electrical energy consumed, usually have a large number of moving parts, many of which come into contact with each other in a rotating manner, thus implying, amongst other things, relatively high maintenance costs, owing to the consumption of lubricants, component wear, etc. In some cases, the high speed of the blades may also be a problem, since they may impact bird life.

As an alternative to multi-blade aerogenerators with rotating electric generators, the use of generators based on the use of piezoelectric elements or materials for converting mechanical energy into electrical energy has also been proposed. For example, FR-2922607-A1 discloses an electrical power generator in which a type of pole is supported on piezoelectric elements, such that when the pole is driven or moved by the wind, the movement of the pole is converted into electrical energy through piezoelectric elements.

On the other hand, CN-201818437-U discloses an electrical power generator for powering sensors and systems with low power consumption, which is also based on a rotor with blades. The rotor is provided with magnets that rotate with the rotor and which interact with magnets coupled to piezoelectric elements such that the rotation of the rotor results in a force on the piezoelectric elements, such that the rotation of the rotor is converted into electrical energy.

JP-2006-158113-A describes another mechanism for converting mechanical energy into electrical energy using a piezoelectric element attached to a magnet.

Moreover, JP-2006-132397-A describes the use of the Karman vortices in water to make a column that is introduced in water vibrate, which is coupled to a piezoelectric plate. Similarly JP-2006-226221-A and WO-2012/017106-A1 refer to electrical generators based on Karman vortices.

For example, WO-2012/017106-A1 describes an electrical power generator driven by wind with a pole made up of a plurality of elements with high electromechanical coupling, a term which encompasses piezoelectric elements. The pole has a section and configuration that deliberately transforms the flow of stationary and laminar air into a turbulent flow, wherein eddies or vortices appear in a synchronised manner throughout the length of the pole. Therefore, the pole sustains two forces, namely, a drag force in the same direction as the wind and a lift force produced in a direction perpendicular to the direction of the wind, the direction of which changes sign, with a frequency that corresponds to the frequency of the appearance of new vortices and which can be calculated using the following formula:

$$F_v = S * V / d,$$

where $F_v$ is the frequency of appearance of vortices, V the velocity of the air and d the characteristic dimension of the pole, for example, in the case of a pole having a circular cross-section, the diameter of the pole. S is Strouhal's dimensionless number. Given that the velocity of the air increases with height, according to the Hellmann exponential Law, to achieve synchronisation in the appearance of vortices, WO-2012/017106-A1 proposes an increase in pole diameter with the increase of height.

WO-2012/017106-A1 does not explain in detail how the movement of the pole is converted into electrical energy. Nonetheless, given that it is indicated that the pole itself is made up of a plurality of elements with high electromechanical coupling, it is understood that it is the swaying of the pole that deforms the elements thereby generating a power differential between the surfaces of the affected elements. On the other hand, WO-2012/017106-A1 proposes active modulation of the apparent Young's modulus or apparent elasticity modulus of the pole, by varying the electrical voltages to which the elements with high electromechanical coupling are subjected.

WO-2014/135551-A1, which is incorporated herein by reference, discloses other examples of electrical power generators based on Karman vortices, in which the oscillating movement of a pole is converted into electrical energy by piezoelectric systems. It also explains how the natural frequency of oscillation of the pole can be modified by applying a voltage to a piezoelectric material that surrounds an elastic core of the pole.

This type of generator based on the Karman vortices can operate without bearings, gears and lubricants and does not require a start system.

Although the use of piezoelectric elements may seem to be an ideal solution to the problem of tuning the pole to variations in the speed of movement of the fluid, for example, the wind speed and also for converting an oscillatory and non-rotational movement—such as the movement naturally generated by the Karman vortices—into electricity, it has been found that it may be interesting to find technically and economically feasible alternatives to the use of abundant piezoelectric material.

US-2008/0048455-A1 describes another example of electrical generator based on Karman vortices, based on the use of a gyroscopic electrical generator. However, this type of mechanism involves rotating generation elements requiring the corresponding maintenance.

WO-2012/066550-A1 describes another generator based on the use of Karman vortices, with an active control of the frequency of vortex formation to adjust it to the natural frequency of oscillation of the capture element.

US-2005/0230973-A1 discloses another vibration based power generator including a vortex shedding device. The described embodiments relate to the context of energy production in a well, taking advantage of the fluid produced from a formation. Different means for converting vibration into electric power are disclosed, including piezoelectric means and magnets interacting with coils.

JP-2012-151985-A and JP-2012-151982-A disclose vibration power generators based on magnets oscillating in relation to a coil, and including means for changing a resonance frequency.

JP-2001-157433-A discloses several different power-generating devices, one of which features a cylinder with an upper part fixed to a support. The cylinder is a vibrating body and a permanent magnet is attached to the lower part of the cylinder. This permanent magnet is related to another, stationary, permanent magnet in a manner such that the repulsive force between these permanent magnets gives rise to a tensile force on the cylinder. A coil is wound around one of the permanent magnets. Bending of the cylinder between its ends caused by a flowing fluid causes the permanent magnets to approach each other and changes the magnetic flux passing through the coil.

SUMMARY

A first aspect of the disclosure relates to an electrical power generator, comprising a first part, for example, in the shape of a post, pillar or pole, configured to be located in a fluid, for example, in the air, although there are also other possibilities, such as water. The fluid may have a substantially stationary and laminar flow, a characteristic that is normally present in the wind. The first part is configured such that, when said fluid moves, it generates vortices in said fluid in such a way that a lift force is generated on the first part producing an oscillating movement of the first part, for example, as described in JP-2006-226221-A, JP-A-2006-132397-A, WO-2012/017106-A1 or WO-2014/135551-A1. The oscillating movement has an amplitude related, in a certain manner, to the wind speed.

In addition, the generator has a second part, which may be substantially static and which surrounds, at least partially, the first part, for example, in correspondence with a base of the first part. In some embodiments of the disclosure, the second part surrounds the first part in correspondence with the 360 degrees of its circumference, whilst in other embodiments of the disclosure the second part is only arranged around a portion or portions of the perimeter of the first part, for example, in correspondence with two diametrically opposed areas of the first part. The first part may comprise a substantially rigid part and another substantially flexible and elastic part anchored in a base or anchoring point, such that, given the flexibility or elasticity of the substantially flexible part, the first part can perform an oscillating or swaying or swinging motion relative to the anchoring point. The second part can surround the first part, at least partly, in correspondence with said base, such that when the oscillating movement of the first part with respect to the base is produced, the first part, for example, the flexible part of the first part, may be tilted alternately to one side of the second part and to the other side of the second part, approaching one side and then the other side of the second part. The first part therefore approaches the second part once for every half cycle of oscillation, from its neutral position.

According to this aspect of the disclosure, the generator comprises a system for generating a magnetic field which produces a magnetic repulsion force between the first part and the second part, a repulsive force that varies with the oscillating movement of the first part and which has a maximum value (that is, a maximum value which occurs once in each half cycle of the oscillating movement, when the first part reaches its closest approaching point to the second part), which increases when the amplitude of the oscillating movement of the first part increases.

Therefore, the magnetic repulsion force between the first part and the second part increases when the amplitude of the oscillatory movement increases and decreases when the amplitude of the oscillatory movement decreases. It has been observed that when the wind speed increases, the amplitude of the oscillatory movement of the first part also increases and the maximum value of the repulsion force also increases. As wind speed continues to increase, although the amplitude grows at a declining rate, the repulsion force on the contrary increases very quickly—since this increase is preferably inversely proportional to the square of a distance between the first part and the second part—allowing the system to store potential energy in the magnets which is completely or substantially converted to kinetic energy (speed) as it passes through the neutral position of zero bending, which allows increasing the natural oscillation frequency of the first part. In other words, the repulsion force modifies the behaviour of the first part as if the Young's modulus or elasticity modulus of the first part were variable. Therefore, when the wind speed increases, the natural oscillation frequency of the first part also increases automatically and vice-versa. Thus, a passive adaptation or passive control of the resonance frequency of the first part as a function of wind speed is achieved, which can serve as an alternative or complement to active adaptation, such as the one based on the application of a voltage to a piezoelectric material described in WO-2014/135551-A1.

For example, in the case of a pole-shaped first part that does not have a system for adapting the resonance frequency, when the wind speeds are too low the pole does not oscillate. As wind speed increases and it approaches the speed at which the frequency of appearance of vortices coincides with the natural oscillation frequency of the structure, the amplitude of the oscillation of the pole increases, until reaching a maximum. If the wind speed continues to increase, the amplitude begins to decrease, since the vortices start to be generated too quickly, whilst the natural oscillation frequency of the structure remains constant. Finally, from a sufficiently high wind speed the pole stops oscillating. The small speed range from the speed at which the pole starts oscillating to the speed at which the pole stops oscillating is called the "lock-in" range. One effect of the disclosure is that, owing to the adaptation of the natural oscillation frequency of the system, the lock-in range can be widened.

In some embodiments of the disclosure, the system for generating a magnetic field comprises at least one first magnet (for example, one or more annular magnets, or a plurality of magnets which are arranged at two or more points, preferably diametrically opposed, of the circumference of the first part, for example, forming continuous or discontinuous rings at one or more heights of the first part) associated to (for example, attached to) the first part and at least one second magnet (for example, one or several annular magnets, or a plurality of magnets which are arranged in correspondence with two or more points, preferably diametrically opposed, of the circumference of the second part, for example, forming continuous or discontinuous rings, at one or more heights of the second part) associated to (for example, attached to) the second part. Said at least one first magnet and said at least one second magnet are arranged in such a way that they repel each other and in such a way that when the oscillating movement occurs in the first part, the distance between said at least one first magnet and said at least one second magnet varies in accordance with said oscillating movement. As the repulsion force between the two magnets is inversely proportional to the square of the distance between the magnets, the force will vary substantially during the oscillation of the first part and its maximum value may depend significantly on the amplitude of the oscillatory movement. Thus, a variation in the amplitude of oscillation of the first part will correspond to a variation in the maximum repulsive force and, therefore, to a variation of the natural oscillation frequency of the first part.

In some embodiments of the disclosure, said at least one first magnet comprises at least two diametrically opposed parts and said at least one second magnet comprises at least two diametrically opposite parts, facing said at least two diametrically opposed parts of said at least one first magnet. In this way, when the swaying or oscillating movement of the first part occurs, the first and second magnets approach each other on one side of the first part, while moving away from the diametrically opposite side and an oscillating force is produced on the first part, the sign and amplitude of which vary periodically, depending on the distances between the magnets.

In some embodiments of the disclosure, said at least one first magnet is configured as at least one ring, for example, as several rings at different heights and/or said at least one second magnet is configured as at least one ring, for example, as several rings at different heights. These rings can be formed of juxtaposed individual magnets. The use of magnets in the shape of a ring, for example, horizontal rings, may be useful for the generator to work in the same way regardless of wind direction. However, for example, in places where the wind blows (or other fluid flows) in only a limited range of directions, it may be enough to have pairs of first and second magnets arranged in the predictable vertical planes of oscillation of the first part.

In some embodiments of the disclosure, said at least one first magnet comprises a plurality of first magnets arranged at different heights above a base of the generator and said at least one second magnet comprises a plurality of second magnets arranged at different heights above a base of the generator.

By choosing the size and strength of the magnets, the number of magnets and the number of rows of magnets in the vertical direction, as well as the position of the magnets, an interaction between the magnets associated to the first part and the magnets associated to the second part can be set, which serves for the natural frequency of the first part to vary in the most aligned manner possible with the frequency of appearance of the vortices, which in turn varies according to the relative velocity between the fluid (for example, air) and the first part.

In some embodiments, said at least one first magnet comprises a first plurality of magnets arranged substantially adjacent to each other, for example, above each other or side by side in the horizontal plane, and with polarities arranged (for example, in accordance with the Halbach array) so that the magnetic field produced by said first plurality of magnets is stronger on a side of said magnets facing said at least one second magnet than on an opposite side, and/or said at least one second magnet comprises a second plurality of magnets arranged substantially adjacent to each other, for example, above each other or side by side, and with polarities arranged (for example, in accordance with the Halbach array) so that the magnetic field produced by said second plurality of magnets is stronger on a side facing said at least one first magnet than on an opposite side. This arrangement serves to enhance the efficiency of the magnets in terms of their contribution to the increase of the resonance frequency of the first part when the speed of the fluid increases, and vice-versa. That is, basically, when arranging the magnets in this manner, for example, following the Halbach array layout, that is, arranging the magnets in this way known to augment the magnetic field on one side of the array while cancelling the field to near zero on the other side, the magnetic field will be strongest on the side where the first and second magnets face each other, and thereby provide for an efficient use of the magnets.

In some embodiments, the at least one first magnet and the at least one second magnet are arranged in an inclined manner in relation to a longitudinal axis, such as a vertical axis, of the first part. In some embodiments, the inclination is such that the distance between the magnets and an axis of symmetry or a longitudinal axis of the first part increases as a function of the height above a bottom end of the first part. For example, the first and second magnets can be arranged as rings of magnets having a truncated cone shape or at least one surface shaped as a truncated cone. This inclination has been found to be useful to introduce a torque that can serve to reduce or eliminate a tendency of the first part to enter resonant modes different from the one corresponding to its natural frequency of oscillation.

In some embodiments or aspects, the first part is arranged so that the amplitude of the oscillating movement increases with the velocity of the fluid, for example, with increasing wind speed, at least within or for a certain range of velocities.

As explained above, the principle of operation can in some embodiments of the disclosure be as follows: the repulsion force between the first magnet or magnets and the second magnet or magnets is inversely proportional to the square of the distance between the first magnet/magnets and the second magnet/magnets; when the speed of the fluid (such as the wind speed) increases, the amplitude of the oscillating movement tends to increase, whereby the magnets tend to get closer during a part of maximum approach of each oscillation cycle, whereby the maximum repulsion force produced between the first magnet(s) and the second magnet(s) in each oscillation cycle increases accordingly. The increase of the repulsion force increases the resonance frequency of the first part, whereby the structure of the generator contributes to an automatic increase in the resonance frequency of the first part when the speed of the fluid increases, and vice-versa.

Another aspect of the disclosure relates to an electrical power generator, comprising a first part, for example in the shape of a post, pillar or pole, configured to be located in a fluid, for example, in the air, although there are also other possibilities, such as water. The fluid may have a substantially stationary and laminar flow, a characteristic that is normally present in the wind. The first part is configured such that, when said fluid moves, it generates vortices in said fluid in such a way that a lift force is generated on the first part which produces an oscillating movement of the first part as described in, for example, JP-2006-226221-A, JP-A-2006-132397-A, WO-2012/017106-A1 or WO-2014/135551-A1.

The generator also comprises a second part that surrounds, at least partially, the first part.

The generator also comprises a subsystem of magnets (comprising at least one magnet) and at least one coil and is configured such that the oscillatory movement of the first part produces a relative displacement between the subsystem of magnets and said at least one coil, such that an electromotive force is generated in said at least one coil. Preferably, the generator comprises a plurality of these coils, preferably arranged around the first part, for example, in one or more circular arrays, in one or more levels above the base of the generator. Therefore, the oscillatory movement of the first part results in a variation in the magnetic field to which the coils are exposed, whereby the oscillatory movement of the first part is converted into electrical energy.

In some embodiments of the disclosure, the subsystem of magnets comprises a plurality of magnets arranged such that when the first part moves during the oscillatory movement from a neutral position to an extreme tilted position, said at least one coil is subjected to at least one change of polarity or direction of magnetic field, preferably to a plurality of changes of direction of magnetic field, such as three, four, five or more changes of polarity or direction of magnetic field.

In some embodiments of the disclosure, the subsystem of magnets comprises at least two sets of magnets arranged at different heights above a base of the generator, each set of magnets comprising a plurality of magnet rings arranged coaxially around the first part and such that a magnetic field is established between said sets of magnets having, radially, at least one change of direction, preferably at least two changes of direction, more preferably at least four changes of direction. Therefore, when the first part oscillates the coils can move between said two sets of magnets and are subjected to repeated changes of polarity or direction of the magnetic field, owing to the polarity alternation defined by the magnet rings. Many changes of polarity/direction may be preferable to increase the production of electricity from a swaying movement of the first part.

In some embodiments of the disclosure, the coils are arranged on the second part and the subsystem of magnets is arranged on the first part. Arranging the coils on the second part can be advantageous as the connections to the electric system can be made without connection to the first part, which is the part the oscillatory mobility of which is critical for the operation of the generator. If the coils are in the first part, the conductors evacuating the energy may be exposed to degradation by fatigue and the viscous losses may be unnecessarily increased.

In some embodiments of the disclosure, the generator comprises a generator or alternator subsystem comprising a first generator module and a second generator module moveable in relation to said first generator module in parallel with a longitudinal axis of the first part (such as a pole), to produce the relative displacement between the magnet or subsystem of magnets and the at least one coil. That is, and differently from prior art arrangements such as those suggested by US-2005/0230973-A1 where the relative movement between magnet and coil basically corresponds to the sideway oscillation of the element that is subjected to vibration due to the vortices, some embodiments the present disclosure involve a movement substantially in parallel with the longitudinal axis of the first part, that is, in the case of a vertically oriented first part, a movement in the vertical direction. Such an arrangement can make use of, for example, gravity to contribute to an oscillating movement of the second generator module in relation to, for example, a stationary first generator module. It can also be useful to facilitate implementation of a second generator module oscillating at a frequency different from the frequency of oscillation of the first part. In some embodiments this arrangement may also be useful to facilitate a concentration of the elements of the generator close to a longitudinal axis of the generator, minimizing its extension or dimension in the lateral direction. The reference to the longitudinal axis of the first part generally refers to the longitudinal axis when the first part is not oscillating. In some embodiments, this is a vertical axis.

In some embodiments of the disclosure, the first generator module is a stationary generator module. In some embodiments of the disclosure, the one or more coils can preferably be arranged in the stationary generator module, for example, externally surrounding the second generator module and/or surrounded by the second generator module. In these embodiments, magnets can be arranged in the second and moveable generator module. In other embodiments of the disclosure, the coil or coils can be arranged in the second generator module and the magnet or magnets in the first generator module. In other embodiments of the disclosure, coils and magnets can be present in both the first generator module and the second generator module, etc. The coils can be associated with elements helping to concentrate or optimise the magnetic field, such as ferromagnetic cores, etc., as known in the art.

In some embodiments of the disclosure, the second generator module is connected to the first generator module by means of a plurality of connecting members arranged to allow for movement of the second generator module in parallel with the longitudinal axis of the first part, and to prevent the second generator module from contacting the first generator module. For example, the movement of the second generator module can take place by a certain bending or flexing of the connecting members. The connecting members can be substantially resistant to elongation, whereby, if appropriately arranged, it can be ensured that the second generator module can only move in parallel with the longitudinal axis of the first part, such as vertically, but not laterally. For example, the connecting members can be made of materials with high mechanical quality factor and high fatigue resistance, such as carbon fibre, titanium, steel, etc.

In some embodiments of the disclosure, each of the connecting members is connected to the first generator module at a first point of connection, and to the second generator module at a second point of connection, wherein these points of connection or the projection of these points of connection on the plane perpendicular to the longitudinal axis of the first part, are separated by an angle $\alpha$ in a plane perpendicular to the longitudinal axis of the first part (that is, when the first part is extending vertically, in the horizontal plane), wherein $\alpha \geq 20°$, preferably $\geq 40°$, such as $\geq 60°$ or $\geq 90°$, viewed from an axis of symmetry of the second generator module, wherein said axis of symmetry in many embodiments of the disclosure corresponds to the longitudinal axis of the first part. This substantial angular separation of the attachment points can be advantageous in that it allows for the use of relatively rigid connecting members, for example, rods or bars of, for example, carbon fibre, titanium, steel, etc., which can serve to maintain the relative position of the first generator module and the second generator module substantially fixed in the plane perpendicular to the longitudinal axis of the first part, thereby preventing contact between the first generator module and the second generator module, while at the same time allowing for a sufficient amplitude of movement of the second generator module in relation to the first generator module in parallel with said longitudinal axis of the first part, such as in the vertical direction.

In some embodiments of the disclosure, the connecting members are arranged to allow for this movement of the second generator module in the direction parallel with the longitudinal axis of the first part by bending. That is, instead of using members that allow for movement by rolling or elongation, the capacity of the connecting members to bend to a certain amount allows for the movement of the second generator module in parallel with the longitudinal axis of the first part. This does not require lubricants, contrary to what is the case in many linear alternators where roller bearings are used that require lubrication. The present disclosure can be implemented without any roller bearings, and allows for long-time use without replacement of parts or supply of lubricants.

In some embodiments of the disclosure, the first generator module comprises at least one first annular frame member and the second generator module comprises at least one second annular frame member, the first annular frame member and the second annular frame member being arranged coaxially, and at least some (preferably at least three or more) of said connecting members are attached to the first annular frame member at one end, and to the second annular frame member at another end.

In some embodiments of the disclosure, the second annular frame member includes a plurality of through holes, the connecting members passing through respective ones of these through holes, whereby the through holes have an extension in parallel with the longitudinal axis of the first part sufficient to allow a relative movement between the connecting members and the second annular frame member in parallel with the longitudinal axis of the first part, when the second generator module is moving or oscillating in parallel with the longitudinal axis of the first part.

In some embodiments of the disclosure, the second generator module is biased in a first direction by first biasing means, such as by first biasing means comprising magnets and/or springs, the first direction being parallel with the longitudinal axis of the first part. In some embodiments of the disclosure, this direction is upwards. In some embodiments of the disclosure, the second generator module is additionally biased in a second direction opposite to said first direction, the second generator module being biased in the second direction at least by gravity. In some embodiments of the disclosure, the second generator module is biased in a second direction opposite to said first direction by biasing means such as magnets and/or springs. In some embodiments of the disclosure, the second direction is downwards.

That is, the second generator module is biased or subjected to forces acting in two opposite directions, such as upwards and downwards, by different means or devices. In some of these embodiments, the biasing in the first direction, such as upwards, is at least in part produced by springs and/or magnets. The biasing in the second direction, such as downwards, can in some embodiments be produced at least in part by springs and/or magnets and/or gravity. This double biasing, that is, the fact that the second generator module is subjected to forces in opposite directions, means that the second generator module can be floating in relation to a position of equilibrium of the biasing forces, and can be caused to oscillate in relation to said position of equilibrium by the oscillating movement of the first part. As the forces exerted on the second generator module from springs and/or magnets (acting for example from above and/or from below the second generator module) will vary depending on the position of the second generator module, this arrangement facilitates oscillation of the second generator module in relation to the position of equilibrium, once it has been displaced from said position.

In some embodiments of the disclosure, the generator is arranged so that during the oscillating movement of the first part, a force is exerted on the second generator module so as to displace the second generator module in parallel with the longitudinal axis of the first part, this force varying during the oscillating movement of the first part. This variation can serve to induce an oscillation of the second generator module in parallel with the longitudinal axis of the first part, and this oscillation implies a relative movement between magnets and coils, thereby converting kinetic energy into electric energy. In some embodiments, this force is caused by the interaction between displacing magnets associated with the first part so that the displacing magnets move according to the oscillatory movement of the first part, and displaced magnets associated with the second generator module. The terms "displacing" and "displaced" refer to the point of view that the oscillation of the first part, that is, of the pole or similar, is the origin of the movement of the second generator module, so that the magnets associated to the first part induce the movement of the second generator module due to their interaction with magnets associated to, such as placed or otherwise attached to, the second generator module.

In some embodiments of the disclosure, the displacing magnets are arranged around and at a distance from the longitudinal axis of the first part, so as to interact with corresponding ones of the displaced magnets during oscillation of the first part, thereby repetitively transferring momentum from the first part to the second generator module.

In some embodiments of the disclosure, the displacing magnets and the displaced magnets have an at least partially spherical shape, and in other embodiments they have an elongated shape and extend in a radial direction relative to the longitudinal axis of the first part.

In some embodiments of the disclosure, the generator is arranged so that as a result of the oscillating movement of the first part, an oscillating movement of the second generator module is produced, said oscillating movement being in a direction parallel with the longitudinal axis of the first part and having a frequency higher than the frequency of the oscillating movement of the first part. In some of these embodiments of the disclosure, the first part, due to its oscillating movement, repetitively interacts with the second generator module and transfers momentum to the second generator module, which thereby continues to oscillate, the frequency of its oscillation depending on a plurality of factors, including dampening due to the generation of electric power, the characteristics of the biasing means, the stiffness of the connecting members, the mass of the second generator module, etc.

In some embodiments of the disclosure, the first part has a first mass and the second generator module has a second mass substantially smaller than the first mass, such as less than 10%, less than 5% or less than 1% of the first mass. The difference in mass can be related to a difference in inertia, which influences the possibility to use the oscillatory movement of the first part at a first frequency to trigger and maintain the movement of the second generator module at a second frequency higher than the first frequency. Obviously, there is no direct relation between the mass of the first part as such and its inertia, as the first part is not moving linearly but rather carries out a pivoting or pendulum-like movement in relation to a certain point, wherefore its inertia has a substantial rotary component. Thus, not only mass and velocity but also the distribution of the mass within the first part is relevant for its inertia. However, as a rule of thumb, a substantial difference in mass, for example, in line with the percentages indicated above, can be beneficial so as to allow for the second generator module to oscillate at a frequency higher than the frequency of oscillation of the first part.

That is, in some embodiments of the disclosure, the oscillation of the second generator module takes place at a frequency substantially higher than the frequency of the oscillation of the first part. More specifically, during each cycle of oscillation of the first part, the first part can, for example, provide one or two short impulses to the second generator module, for example, due to an approximation between displacing and displaced magnets that produces a rapid increase in the repulsive force between these magnets. This induces a displacement of the second generator module, and the opposing biasing forces described above contribute to a continued oscillation of the second generator module around a point or level of equilibrium. Thus, a relatively slow oscillation of the first part can serve to induce a much faster oscillation of the second generator module, which enhances the efficiency of conversion of mechanical energy into electrical energy.

In some embodiments of the disclosure, the second part comprises a first generator module and a second generator module moveable in relation to said first generator module to produce the relative displacement between the magnet or magnets, that is, the subsystem of magnets, and the at least one coil. For example, the second generator module can comprise one or more magnets and the first generator module can comprise coils, or vice-versa, or one of or both generator modules can include magnets and coils. The second generator module is suspended so that it can oscillate in relation to the first generator module, at a frequency different from the frequency of the oscillating movement of the first part. In many embodiments of the disclosure, the first part is oscillating at a relatively low frequency, and it can be desirable to produce the displacement between magnet(s) and coil(s) at a higher frequency, to enhance efficient production of electric power. The electromotive force induced in a coil is proportional to the change in the magnetic field traversing the coil. Thus, arranging the second generator module to oscillate at a higher frequency instead of being tied to oscillate at the frequency of oscillation of the first part, has been considered to be advantageous.

In some embodiments of the disclosure, the second generator module is arranged to be repetitively triggered by the first part during said oscillating movement of the first part, so as to receive energy and momentum from the first part. That is, the first part is caused to move by the vortices, whereby energy is transferred from the fluid to the first part, and part of this energy is then transferred to the second generator module, which is caused to oscillate, whereby part of this energy is converted into electric energy due to the relative movement between magnet(s) and coil(s). The triggering can preferably be impulse-like, that is, take place during short time periods. This can, for example, be achieved by letting the displacing magnets approach the displaced magnets with a movement substantially perpendicular to the direction of the movement of the second generator, whereby the component of the repulsive force in the direction parallel with the direction of the movement of the second generator module increases rapidly. Thus, the oscillatory movement of the second generator module is repetitively fed and thereby maintained, due to the interaction between the second generator module and the first part. The first part including associated elements may have a substantially larger inertia and generally a larger mass than the second generator module, whereby this triggering can cause the second generator module to oscillate at a relatively high frequency, compared to the frequency of oscillation of the first part; the link between mass and inertia has been discussed above.

In some embodiments of the disclosure, the second generator module can be arranged to be repetitively triggered by the first part during said oscillating movement of the first part, by magnetic interaction between the first part and the second generator module. Magnetic interaction can be preferred so as to avoid direct impact, which may result in wear. However, in other embodiments of the disclosure, triggering by direct impact may be considered. Embodiments featuring magnetic interaction can comprise a plurality of magnets (which can be referred to as displacing magnets) arranged, for example symmetrically, around the longitudinal axis of the first part so as to be displaced by the first part, and corresponding magnets (which can be referred to as displaced magnets) attached to the second generator module. A force of repulsion or attraction between displacing magnets and displaced magnets is inversely proportional to the square of the distance between the magnets. Thus, this force increases rapidly when the so-called displacing and the so-called displaced magnets are approaching each other, which can provide for an impulse-like triggering, where momentum is transferred from the first part to the second generator module.

In some embodiments of the disclosure, the second generator module is arranged to be triggered by the first part during said oscillating movement of the first part every time the first part returns to a center or neutral position during said oscillating movement, for example, everytime the first part aligns with the vertical axis. This choice of triggering can help to make sure that, for example, a plurality of magnets ("displacing magnets") attached to the first part are appropriately positioned in relation to corresponding magnets ("displaced magnets") on the second generator module, so as to provide for appropriate triggering, irrespective of the orientation of the plane in which the first part is oscillating. Also, as the velocity of the oscillator movement in terms of velocity of displacement of the first part is at its maximum when reaching the neutral or center position, arranging for triggering to take place at this moment enhances the impulse-like character of the triggering and transfer of energy and momentum. In some embodiments, the displacing magnets and the displaced magnets are arranged taking into account the fact that the first part may suffer a certain displacement in the direction of the wind. In some embodiments, instead of using for example substantially spherical magnets, magnets can be used that are elongated in a radial direction in relation to the longitudinal axis of the first part.

In some embodiments of the disclosure, the second generator module is attached to the first generator module by means of flexible connecting members such as bars or rods of metal (such as titanium or steel), carbon fibre, or similar, selected and arranged to allow for displacement of the second generator module in an axial direction, for example, by bending of the connecting members, but preventing the second generator module from touching the first generator module.

In some embodiments of the disclosure, these flexible connecting members have a cross section having a first width in a direction parallel with said axial direction of displacement of the second generator module, and a second width in a direction perpendicular to said axial direction, said second width being larger than said first width. Thereby, movement of the second generator module in the axial direction is facilitated, whereas movement in a direction perpendicular to said axial direction is made more difficult.

In some embodiments of the disclosure, the first part has a longitudinal axis extending generally vertically when the first part is not oscillating, and the second generator module is arranged to oscillate vertically. Thus, oscillation of the first part in relation to a vertical axis is arranged to trigger the second generator module to oscillate up and down. The second generator module can be suspended in a floating manner by magnets or springs biasing the second generator module upwards, and optionally also by magnets or springs biasing the second generator module downwards.

Some embodiments of the disclosure incorporate both the first aspect and the second aspect described above. In some of these embodiments of the disclosure, some or all the magnets that are part of the subsystem of magnets used to induce electrical current in the coils can also serve for at least part of the tuning of the natural oscillation frequency of the first part to wind speed. For example, at least some of the first magnets can be part of the subsystem used to induce current in the coils, which is why these magnets may have a dual function.

In some embodiments of the disclosure, the first part may comprise an oscillating pole, configured to be able to oscillate under the influence of the Karman vortices and the second part may comprise a static structure located in correspondence with the base of the pole. In some embodiments of the disclosure, the first part will have a height of at least 1 meter, for example, more than 2, 5, 10, 15, 60, 100, or 200 meters. In other embodiments of the disclosure, the pole may be smaller, for example, it may have a height lower than 1 m, for example, lower than 10 cm, lower than 1 cm, or even smaller. It has been found that even very small equipment can work properly, since they are able to adapt quickly to the changes in the wind (turbulence) given their rapid oscillation frequency. It is considered that it may even be possible to produce nanometric generators based on the principles of the present disclosure.

Another aspect of the disclosure relates to a method for making an electrical power generator tune with wind speed. The method is applicable to an electrical power generator comprising a first part, for example, in the shape of a post, pillar or pole, configured to be located in a fluid, for example, in the air, although there are also other possibilities, such as water. The fluid may have a substantially stationary and laminar flow, a characteristic that is normally present in the wind. The first part is configured such that, when said fluid moves, it generates vortices in said fluid in such a way that a lift force is generated on the first part which produces an oscillating movement of the first part as described in, for example, JP-2006-226221-A, JP-A-2006-132397-A, WO-2012/017106-A1 or WO-2014/135551-A1. The generator also comprises a second part that surrounds, at least partially, said first part.

The method comprises the step of placing at least one first magnet on the first part and at least one second magnet on the second part, such that said at least one first magnet and said at least one second magnet repel each other. The effect achieved with this arrangement has been explained above, which serves for the natural oscillation frequency of the first part to adapt, automatically, to the frequency of appearance of vortices.

Another aspect of the disclosure relates to the use of a plurality of magnets in an electrical power generator comprising a first part, for example, in the shape of a post, pillar or pole, configured to be located in a fluid, for example, in the air, although there are also other possibilities, such as water. The fluid may have a substantially stationary and laminar flow, a characteristic that is normally present in the wind. The first part is configured such that, when said fluid moves, it generates vortices in said fluid in such a way that a lift force is generated on the first part which produces an oscillating movement of the first part, as described in, for example, JP-2006-226221-A, JP-A-2006-132397-A, WO-2012/017106-A1 or WO-2014/135551-A1. The generator also comprises a second part that surrounds, at least partially, said first part. The use of the magnets is intended to generate an automatic adaptation of the natural oscillation frequency of the first part to the wind speed.

Another aspect of the disclosure relates to a method for producing a capture element for an electrical power generator based on the Karman vortices, the capture element comprising a substantially rigid top part and a flexible and elastic bottom part. In this context, the terms "rigid" and "flexible" are used to indicate that the oscillatory movement is substantially owing to the deformation of the substantially flexible/elastic part and not to any deformation of the substantially rigid part. The rigid top part is attached to a base by the flexible bottom part, such that the rigid top part can oscillate relative to said base. The flexible bottom part has an effective length "L"; the effective length is the length of the flexible bottom part along which the flexible bottom part bends when the rigid top part is oscillating, namely, it is the section of the flexible bottom part between its attachment to the base and its attachment to the rigid top part.

The rigid top part has a characteristic dimension (the diameter in the case of a circular cross section) that varies depending on a height "Y" on the attachment point of the flexible bottom part to the base.

The method comprises the steps of:
  establishing a design of the rigid top part in terms of its characteristic dimension (the diameter in the case of a rigid top part with circular cross section) depending on the height above said attachment point, using a formula based on an estimation of oscillation of the rigid top part with respect to a point located at a height of between 0.3*L and 0.7*L above said attachment point (it has been verified with calculations that this allows a substantially realistic estimate of the relative velocity between air and the rigid top part for the small angles of oscillation that are often preferred for this type of generators, an estimate that appropriately takes into account both the variation of wind speed and the variation of the speed of the rigid top part owing to the oscillatory movement, according to the height); and
  producing a capture element with a rigid top part presenting said design.

In this way, a capture element whose characteristic dimension varies in an appropriate way such that the vortices appear synchronously throughout the rigid top part is obtained.

BRIEF DESCRIPTION OF THE DRAWINGS

To complement the description and to better understand the features of the disclosure, in accordance with examples of practical embodiments of the same, a set of drawings is attached wherein:

FIGS. 13A-13D show, schematically, the geometric method used for determining the distance from the ground at which an extension of the pole does not suffer horizontal displacement for small bending angles;

DETAILED DESCRIPTION OF THE DRAWINGS

Figure 1:
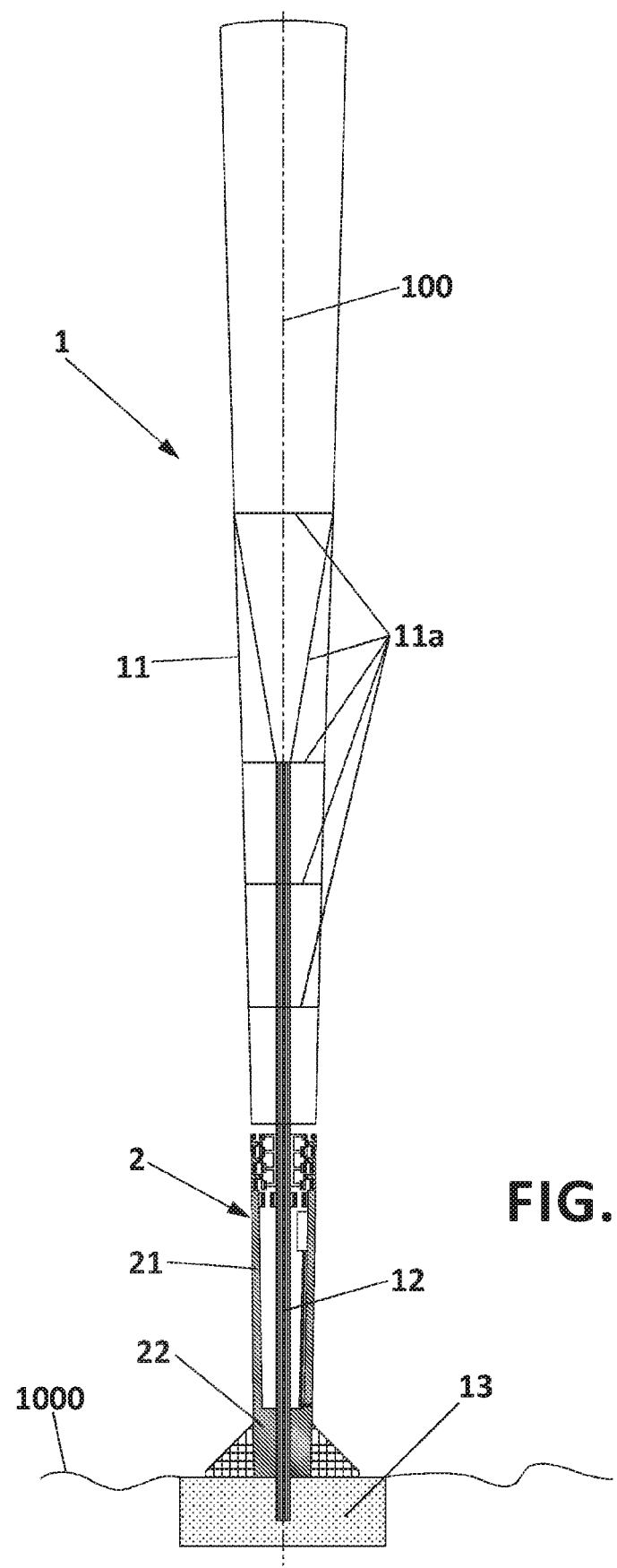
FIG. 1 is a schematic elevational view in which some of the components of a generator in accordance with a possible embodiment of the disclosure can be seen.

FIG. 1 shows, schematically, a generator according to a possible embodiment of the disclosure comprising a first part in the shape of pole 1 extending vertically upwards from the ground 1000, the pole 1 being anchored in the soil by an anchoring base 13 which can be made of cement, concrete, or any other suitable material. In many embodiments of the disclosure, the pole has a longitudinal axis 100, and in many embodiments of the disclosure the pole 1 is substantially symmetric with regard to said longitudinal axis.

Figure 2:
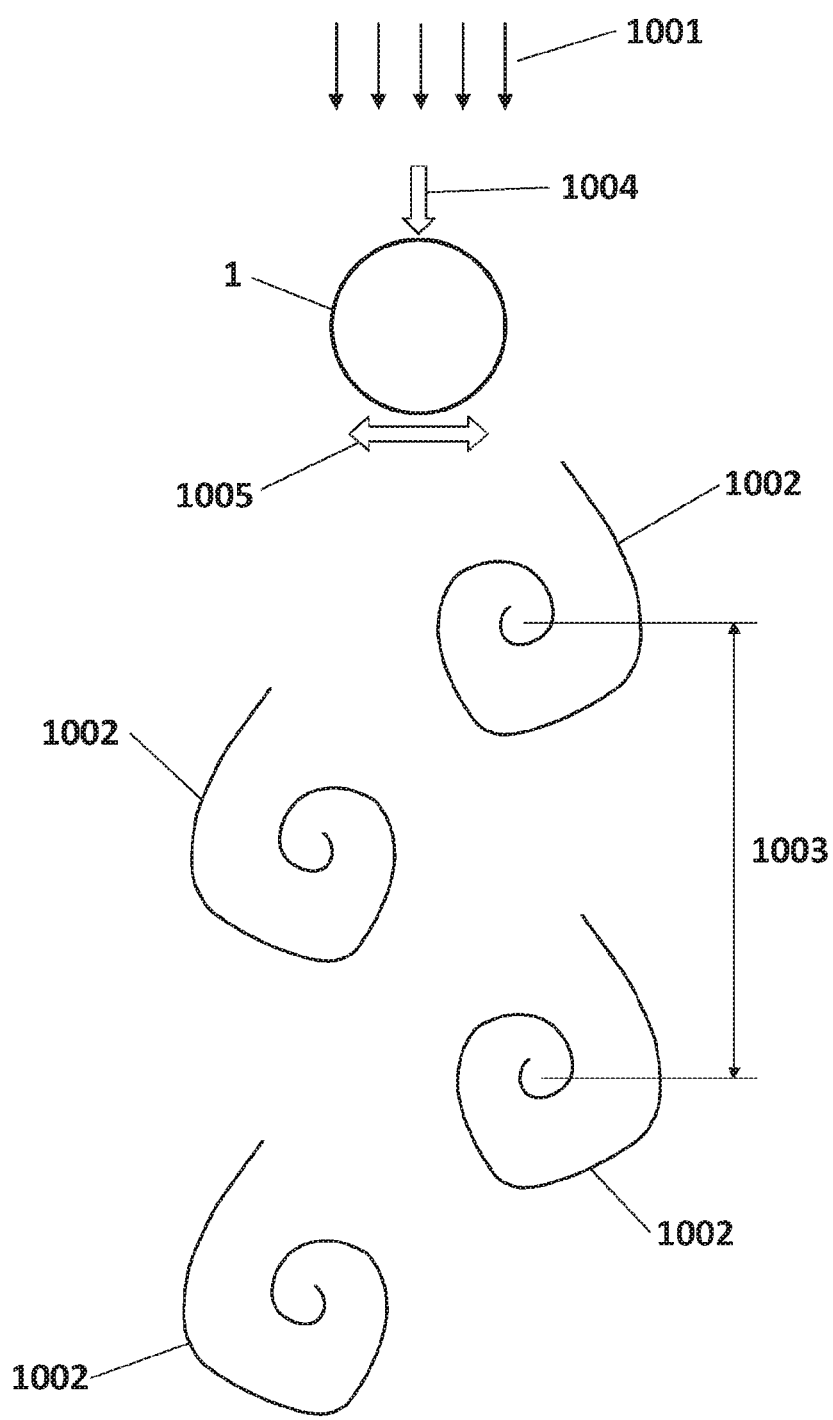
FIG. 2 is a schematic cross section view of the oscillating pole of the generator according to this preferred embodiment and of the vortices generated in the fluid surrounding it.

As shown in FIG. 2, when the laminar flow 1001 of the wind strikes on the pole-shaped first part 1, it produces a series of vortices 1002 that occur alternately on one side and on the other side of the pole 1 and with a constant distance 1003 between the successive vortices on each side of the pole. Therefore, a substantially constant drag force 1004 in the direction of the wind and a lift force 1005 substantially perpendicular to the general direction of the wind and to the direction of the drag force are produced on the pole 1. This lift force 1005 switches sign periodically, with a frequency which corresponds to the onset of the vortices, and this force causes the oscillation of the pole 1, towards one side and towards the other side. In this embodiment of the disclosure, the pole 1 has a circular cross section, such that its performance in what regards capturing energy of the wind does not depend on the direction of the wind, which can vary over time. In other embodiments of the disclosure, for example, when there is one very predominant direction of movement of the fluid, the pole may have another type of cross section, but the circular cross section can often be the most appropriate one.

Figure 3:
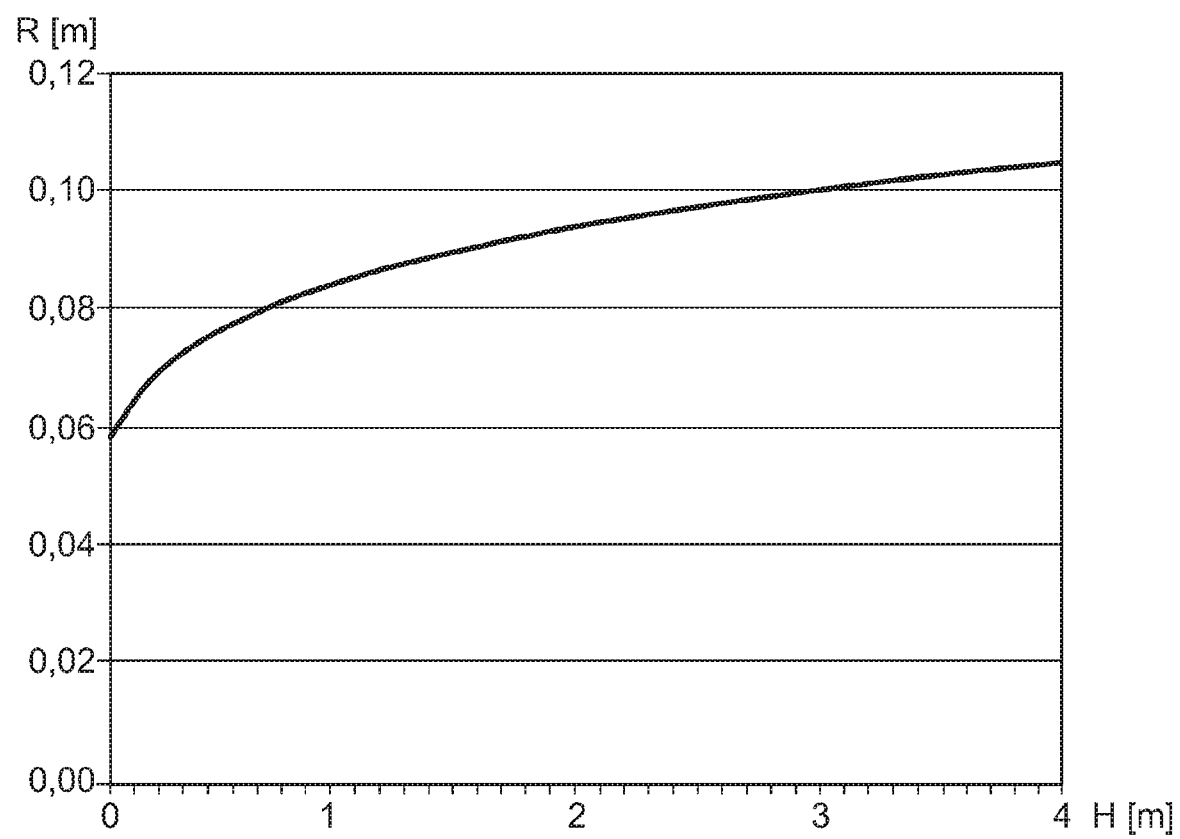
FIG. 3 is a diagram that illustrates, schematically, the relationship between the radius (R) of a pole and the height (H) above the ground, according to the state of the art (this figure is present in WO-2014/135551-A1)

The frequency of appearance of vortices depends on wind speed. Therefore, in order to maximise the energy capture of the pole, it may be desirable for the vortices to appear in a synchronised manner along the pole 1. Given that the wind speed, according to the Hellmann exponential Law, increases with height and given that the frequency of the appearance of vortices depends on both the relative velocity between air and pole (which in turn depends on wind speed) and on the characteristic dimension of the pole (in this case, on the diameter of the pole), it is appropriate for the diameter of the pole to increase with height as the relative velocity between air and pole increases with height. FIG. 3 illustrates schematically how, according to what is described in WO-2014/135551-A1, in the case of a pole having a radius (R) of approximately 60 mm at ground level, the radius increases to approximately 83 mm at the height (H) of 1 metre above the ground and to approximately 105 mm at a height of 4 metres above the ground. The ideal increase of the radius with height depends on the value of the Hellmann exponent and this exponent depends on the characteristics of the surroundings. In flat places, with ice or grass, its value is minimal and in very rough terrain or in cities, its value is higher.

On the other hand, as is known, when a force of oscillation is applied to an element or object, the corresponding energy is absorbed better if the force that is applied oscillates at a frequency that corresponds to the natural oscillation frequency of the object in question. The natural frequency depends on parameters such as the density and rigidity of the element. For a first part or pole 1 having a specific configuration and constitution, the frequency at which the vortices are generated and at which the lift force 1005 oscillates, will depend on the wind speed. As indicated in WO-2012/017106-A1 and in WO-2014/135551-A1, it may be desirable to synchronise the natural oscillation frequency of the first part with the frequency of appearance of the vortices.

Given that this frequency of appearance of vortices, for a determined capture element or pole, depends on wind speed, it may be desirable to vary the natural oscillation frequency of the pole based on wind speed.

For a solid bar, its natural oscillation frequency is:

$$\omega = ((I^* E^* K^4)/d) - a^2)^{(1/2)}$$

where E is Young's modulus, I is the sectional inertia moment, d is the density of the bar per unit of length, K is the spatial mode of oscillation (the $1^{st}$ mode and its harmonics) and a is a damping constant. The more a structure is dampened (in other words, the more energy is extracted from it in the form of viscous losses, friction, etc.), the lower their oscillation frequency will be. The natural oscillation frequency of any structure depends on the damping to which it is subjected. Consequently, the more electrical power is extracted from the generator, the less its natural oscillation frequency is, unless this is offset by, for example, tensioning the structure, increasing its rigidity, etc.

Figure 4:
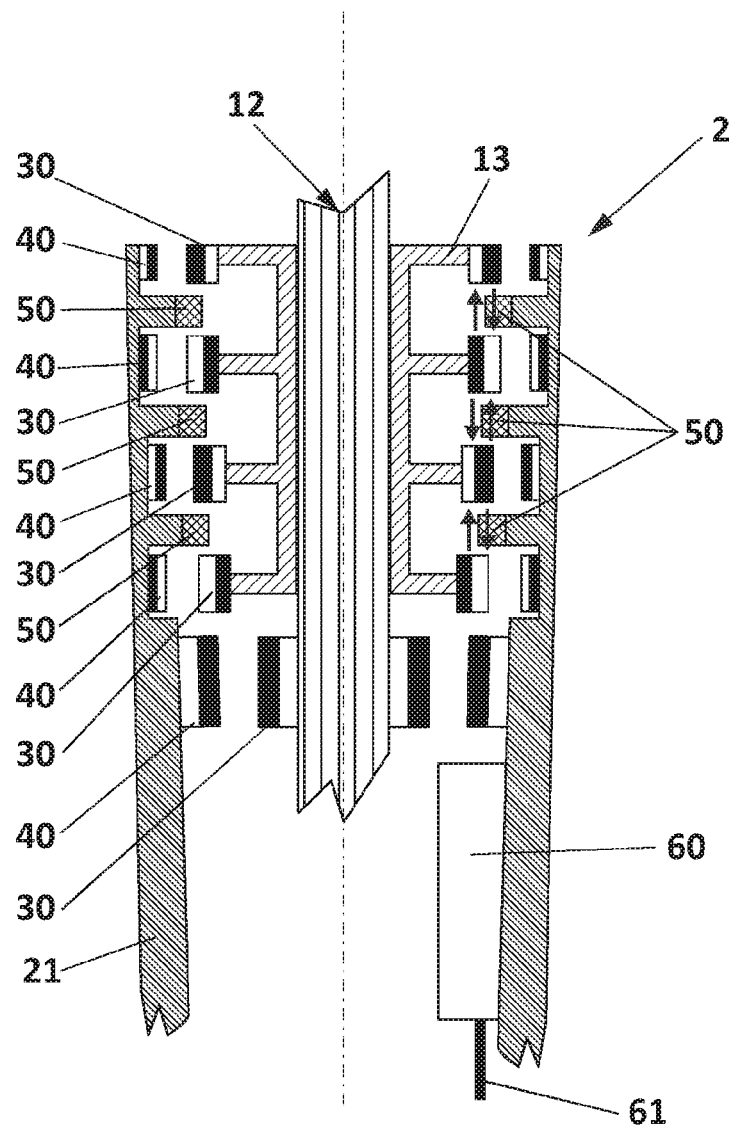
FIG. 4 shows with greater detail the distribution of magnets and coils between the oscillating pole and the static structure, in the preferred embodiment illustrated in FIG. 1.

WO-2014/135551-A1 describes how this can be achieved by actively acting on the piezoelectric material that is part of the structure of the pole. The generator illustrated in FIG. 1, a detail of which is shown in FIG. 4, has a passive system for adapting the natural oscillation frequency, based on the use of magnets associated to the pole 1 and with a static structure 2 arranged in correspondence with the base of the pole 1, surrounding the pole 1. FIGS. 1 and 4 show how in this embodiment of the disclosure the static structure 2 comprises a substantially cylindrical wall 21 which surrounds the pole 1 in correspondence with its bottom part.

As shown in FIGS. 1 and 4, this static structure 2 forms a second part of the generator and completely or partially surrounds the pole 1. The pole 1 comprises a relatively rigid part 11, which can be substantially hollow and made of lightweight materials such as, for example, carbon fibre, fibreglass, polyester resin, epoxy resin, basalt fibres, balsa wood, aluminium and/or titanium, etc. It may be advantageous that the material does not conduct electricity. This rigid part may include internal reinforcing elements 11*a* such as ribs, brackets or beams that provide structural rigidity. The upper end of the pole is preferably closed, for example, by a cap.

On the other hand, the pole 1 comprises a relatively flexible part 12, which is the one joining the pole 1 to the anchoring base 3 such that the rigid part 11 may substantially oscillate with respect to the base, despite its stiffness. This flexible part 12 may be a type of flexible rod which can be elastically deformed sideways, in an oscillatory manner, allowing the rigid part to oscillate as well. The bottom part of the flexible part 12 is embedded in a base 22 of the static structure 2 and its top part is housed within the rigid part 11 of the pole. FIG. 1 shows how the flexible rod 12 extends through the base 22 of the static structure and is also embedded in the anchoring base. However, a substantial part of the flexible part 12 is free and able to oscillate, together with the rigid part 11 towards one side and the other, owing to the aforementioned lift force.

FIG. 4 shows that the flexible part 12, in the shape of a rod, supports five magnet rings 30 and that coaxially with respect to these magnet rings 30 there are five magnet rings 40 mounted on the static structure 2, coaxially with respect to the flexible part 12 of the pole. The magnets 30 mounted on the flexible part 12 of the pole 1 and the magnets 40 mounted on the static structure 40 are arranged in such a way that they repel each other, or in other words, the poles of the same sign are facing each other, as schematically illustrated in FIG. 4 where the black part of the magnet represents the N pole and the white part the S pole.

In this way, when the oscillation of the pole 1 is produced, the flexible part 12 bends towards one side and towards the other, whereby a part of the magnets 30 mounted on the flexible part 12 approaches a part of the magnets 40 mounted on the static structure 2, while on the diametrically opposite side of the flexible part 12, a part of the magnets 30 moves away from the corresponding part of the magnets 40. The repulsion force between the magnets 30 and 40 is inversely proportional to the square of the distance between the magnets 30 and 40. When the wind increases, the amplitude of the oscillatory movement of the pole tends to increase, whereby the magnets 30 and 40 tend to get closer and closer during the part of maximum approach of each oscillation cycle and therefore, the maximum repulsion force produced between the magnets 30 and 40 in each oscillation cycle increases accordingly. The increase of this repulsion force increases the resonance frequency of the structure. In this way, the very structure of the generator of FIGS. 1 and 4, with its magnets 30 and 40, contributes to an automatic increase in the resonance frequency of the pole when the wind speed increases and vice versa. In this way, by properly selecting and arranging the magnets 30 and 40, something that can be done by trial and error tests and/or by computer simulations, the automatic adjustment of the natural oscillation frequency of the pole to wind speed can be achieved, such that it is always tuned with the frequency of appearance of vortices, thereby achieving a good uptake of energy from the movement of the fluid. In other words, a function of the magnets 30 and 40 may be to obtain the automatic tuning between the natural oscillation frequency of the pole and the frequency of appearance of vortices.

In other words, for example, both the oscillating pole 1 and the stationary part 2 are provided with magnets, for example, in the shape of magnetic rings or sets of individual magnets arranged in the shape of a ring, arranged coaxially and in such a way that the poles of the same sign repel (north against north or south against south). This allows magnetically confining the movement of the pole and increasing the oscillation frequency of the pole as the amplitude of oscillation increases.

Figure 16A:
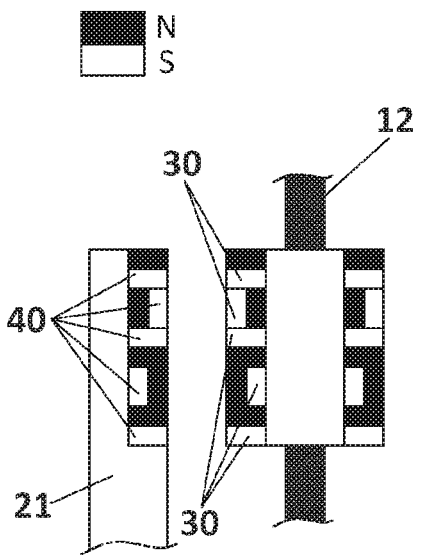
FIGS. 16A-16D illustrate the arrangements of the first and second magnets in accordance with four different embodiments of the disclosure.

FIG. 16A shows how these magnets can be arranged in one embodiment of the disclosure. The magnets are arranged in rings surrounding a vertical axis of symmetry of the generator, whereby the magnets 40 are arranged on a portion 21 of the static structure forming an outer ring of magnets, and the magnets 30 are arranged on the flexible part 12 of the pole 1, forming an inner ring of magnets. The outer ring of magnets 40 has a height corresponding to five magnets 40 arranged above each other, and the inner ring of magnets has a height corresponding to five magnets 30 arranged above each other. In both rings, the magnets are arranged following the so-called Halbach array in the vertical direction, that is, with the polarities alternating so that the magnetic field generated by the magnets is stronger on the side where the two rings of magnets are facing each other, than on the other side. Thus, efficient use is made of the magnets in terms of their contribution to the tuning of the natural oscillation frequency of the pole.

Figure 16B:
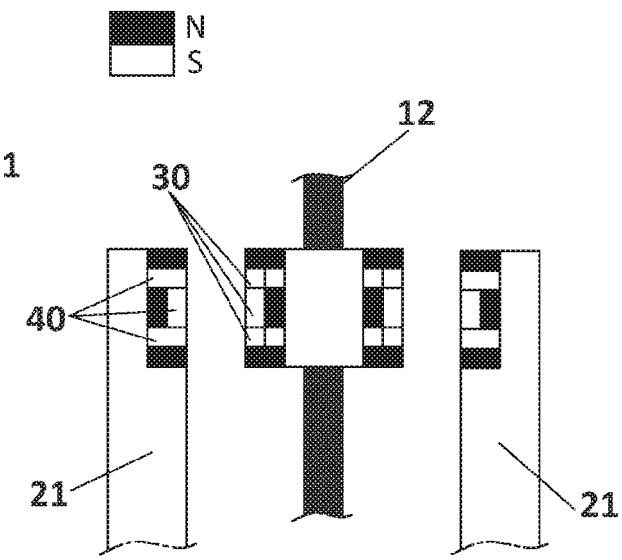

FIG. 16B illustrates a similar arrangement, but with only three magnets following each other in the vertical direction.

Figure 16C:
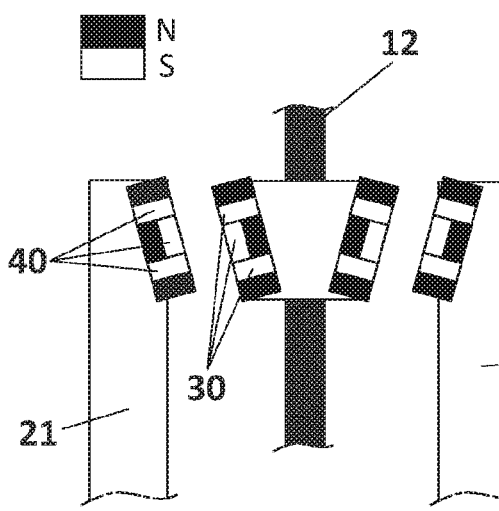

FIG. 16C illustrates an arrangement in line with the one of FIG. 16B, but with the magnets arranged in an inclined manner, so that both the outer and the inner rings have a shape corresponding to a truncated cone. This arrangement is considered useful for the purpose of producing a certain torque on the flexible part 12, preventing it from entering resonant modes different from the first mode of resonant oscillation of the first part.

Figure 16D:
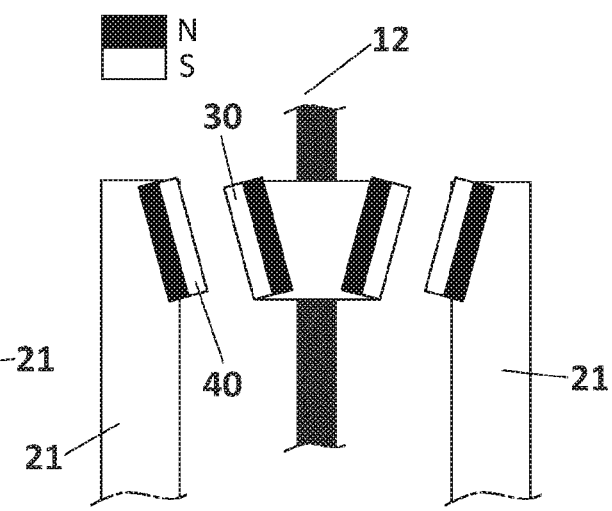

FIG. 16D schematically illustrates an embodiment like the one of FIG. 16C, with the difference that each ring of magnets has a heighT corresponding to only one magnet. This kind of layout may be simpler to produce than the one of FIG. 16C, but it does not feature the advantages provided by the Halbach effect.

FIG. 4 illustrates how a plurality of coils 50 is mounted on the static part 2, in correspondence with its top part where substantial movement of the flexible rod 12 towards the sides occurs. The turns of the coils 50 are parallel or almost parallel to the horizontal plane. As illustrated in FIG. 4, the coils 50 are distributed in three levels, i.e., at three different heights above the base of the generator. These coils 50 can be provided with ferromagnetic cores 51.

The coils are arranged such that when the pole 1 oscillates, some of the above mentioned magnets 30 pass above and below the coils. As shown in FIG. 4, for each coil 50 there is a magnet 30 located at a height slightly above the coil and another magnet 30 located slightly below the coil, the polarity of the magnets being inverted such that when the coil passes above one of the magnets 30, the coil 50 passes once through a magnetic field oriented in one direction (for example N-S) and once through a magnetic field oriented in the opposite direction (S-N), as it has been schematically indicated in correspondence with one of the coils and pairs of magnets in FIG. 4. The passage of the coil through a varying magnetic field induces an electromotive force or potential in the coil, which may be collected and adapted by an electric power system 60, schematically shown in FIG. 4.

In other words, in order for the turns to produce an electromotive force and to generate electric power, several levels of magnetic rings 30 (or a set of individual magnets arranged in the shape of a ring) have been arranged on the flexible rod 12. The number of levels of magnetic rings 30 is equal to the number of levels of coils plus one (there are four levels of magnetic rings associated to the three levels of coils 50 in FIG. 4). In this way, the movement of the magnetic rings produces a change of direction and sense of the field lines within the coils. Each level of magnetic rings will have its antagonist, from the magnetic point of view, on its neighbour or neighbours, i.e., if the outermost part of one of the levels of magnetic rings is a south pole, its neighbouring level or levels will have on the outermost part a north pole and vice versa, as it has been schematically illustrated in FIG. 4.

Figures 5, 6:
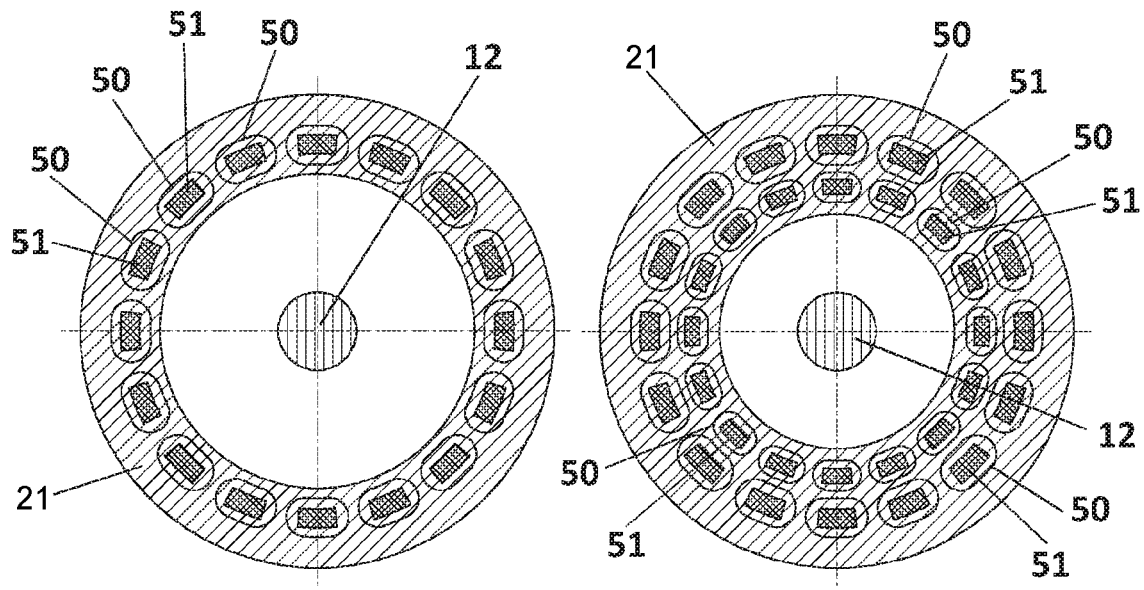
FIGS. 5 and 6 show, schematically, two different distributions of coils in a horizontal cross section of a generator according to two embodiments of the disclosure.

FIG. 4 shows, schematically, how the magnets 30 are mounted on a support structure 13 mounted on the flexible part 12 and how the coils 50 are mounted on the static structure 2 itself (see also FIG. 5). It would also be possible to mount the coils 50 on the pole, but from the practical point of view it may be preferable to mount them on the fixed portion to facilitate the connection to the external network to which the generated power is intended to be transmitted, thereby reducing the risk of fatigue rupture of the conductors evacuating the energy and avoiding unnecessary viscous losses. The energy generated by the coils 50 can be appropriately rectified and conditioned by a power electronics system 60, which may include for example an inverter, etc., and a conduction system 61 can evacuate the electric power generated.

FIG. 6 shows an alternative configuration in which, at every level of coils—there are three levels of coils 50 in FIG. 4—the coils are arranged in two concentric rings. The number of rings, the size of the coils, etc., is something that the person skilled in the art will chose depending on aspects such as the size of the generator, the displacement in the lateral direction of the flexible part during the oscillation, etc., with the purpose of achieving an optimal or at least acceptable performance of the generator.

Figures 7, 8:
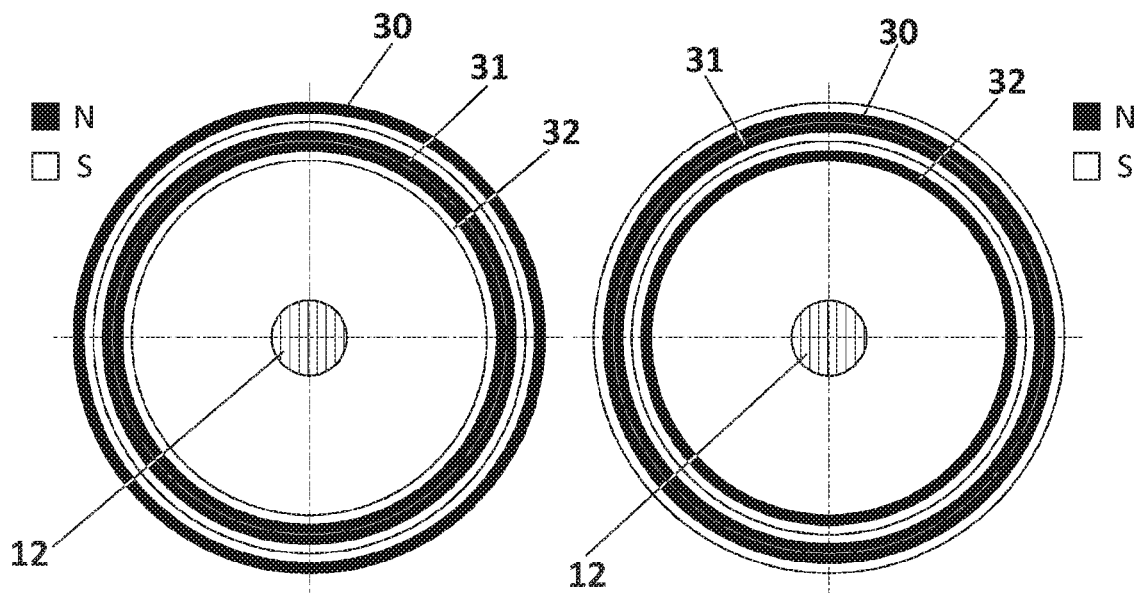
FIGS. 7 and 8 show two sets of magnets associated to the pole, according to a possible embodiment of the disclosure.
Figure 9:
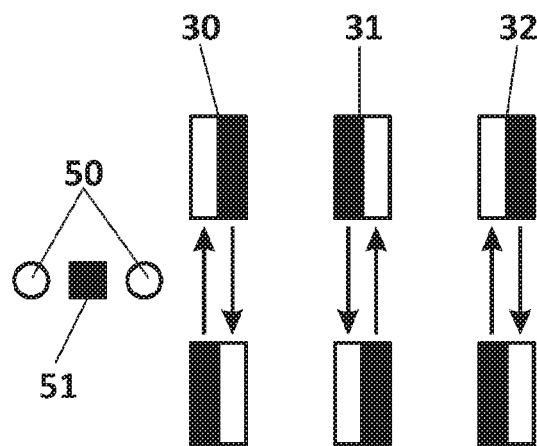
FIG. 9 illustrates, schematically, a cross section in the vertical plane of the two sets of magnets of FIGS. 7 and 8 and a coil with respect to which said sets can move.

FIGS. 7, 8 and 9 show, schematically, how in some embodiments of the disclosure, the magnets mounted on the support 13 discussed above can be arranged, at every level, in the shape of a plurality of concentric rings 30, 31 and 32. FIG. 9 is a vertical cross section view of the two sets of magnets illustrated in FIGS. 7 and 8, one arranged above the other and separated by a gap in which the coils 50 can fit. As it is shown, with these two sets placed at a certain distance from each other in a vertical direction, a separator space is established in which three changes of polarity or direction of the magnetic field occur in each coil. Therefore, when a coil 50 passes through said space owing to the oscillatory movement, the coil will be subjected to a magnetic field that changes polarity a plurality of times. Given that the current generated depends on the variations in the magnetic field to which the coil is subjected, this high frequency variation in the magnetic field is beneficial for the generation of current.

In some embodiments of the disclosure, the magnets 30, 31 and 32 mounted on the flexible rod 12 may have ferromagnetic material attached to them to conduct the field lines in a suitable manner for, for example, increasing, within a given space, the number of polarity/direction changes of the magnetic field, to maximize the number of changes of direction of magnetic field to which the coils 50 are subjected during a cycle of oscillation of the pole.

As follows from what has been previously explained, in an embodiment of the disclosure as the one from FIGS. 1 and 4, the top part of the static part has a function corresponding to that of the stator of a non-conventional alternator designed to produce energy without the use of any bearing or reduction gearbox and that can produce power regardless of the direction in which the rod 12 is flexed.

FIG. 4 shows how the magnets are mounted on a total of five rows, of which the four top rows contribute to the electrical power generation owing to their interaction with the coils 50, while both the four top rows and the bottom row contribute to the auto-tuning of the generator to wind speed.

Figure 10A:
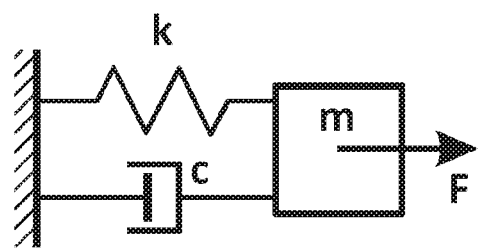
FIGS. 10A and 10B illustrate two simplified models of the behaviour of a pole without any tuning system (FIG. 10A) and with a tuning system (FIG. 10B), respectively.
Figure 10B:
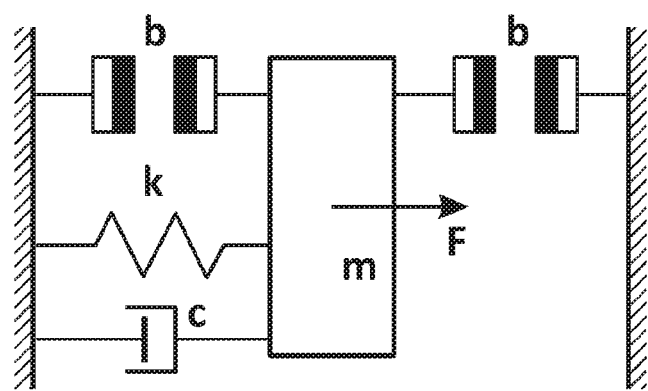

FIGS. 10A and 10B illustrate schematically the behaviour of a pole without any tuning system (FIG. 10A) and the behaviour of a pole with the tuning system according to a possible embodiment of the disclosure (FIG. 10B).

The object of the tuning mechanism is to modify the natural oscillation frequency of the equipment according to the speed of the fluid. When the device has no tuning system its movement can be modeled as the one of a damped simple harmonic oscillator (a) (FIG. 10A):

$$m \cdot \ddot{x} + c \cdot \dot{x} + k \cdot x = 0 \qquad \text{a)}$$

where m is its mass, c is the damping constant including the structural damping of the device itself, other losses and the mechanical energy converted into electrical energy and k is the elasticity constant of the elastic rod. In this case, the natural oscillation frequency of the equipment is:

$$w_0 = \sqrt{\frac{k}{m}} \qquad \text{b)}$$

When, given the generation of vortices, the oscillating pole is affected by the sinusoidal force F with maximum value $F_0$ (proportional to the square of the frequency if the value of the lift coefficient is considered constant), a delay in $\varphi$ and frequency $w = 2 \cdot \pi \cdot f$ (w[rad/s], f[Hz]), the movement can be modelled as the one of a forced damped harmonic oscillator:

$$m \cdot \ddot{x} + c \cdot \dot{x} + k \cdot x = F = F_0 \cdot \cos(wt + \varphi) \qquad \text{c)}$$

When the frequency w coincides with the natural frequency of the equipment $w_0$, the latter enters in resonance and experiences a remarkable increase in its ability to absorb energy from the fluid.

As the frequency ω is proportional to the speed of the fluid, in principle, given that the device has only one natural oscillation frequency (in the first oscillation mode), there will only be one single speed at which the device would work. However, a power generator such as an aerogenerator will be more profitable the greater the number of hours/year it can be in operation. As explained above, there is a small range of wind speeds (the aerodynamic phenomenon of lock-in) in which an equipment based on the Karman vortices can maintain its resonance, but this is far smaller than desirable for a reasonably competitive aerogenerator.

In order to be able to increase this range of wind speeds, a tuning mechanism can be incorporated that modifies the oscillation frequency of the device. Thus, the pole will oscillate at greater frequency in the presence of higher wind speed, or in other words, in the presence of an increase in the frequency of appearance of vortices.

The arrangement of FIG. 10B differs from that of FIG. 10A by the addition of two pairs of magnets in repulsion mode. The movement of said model can be described by the following expression:

$$m \cdot \ddot{x} + c \cdot \dot{x} + k \cdot x + \frac{b}{(d-x)^2} - \frac{b}{(d+x)^2} = F \quad \text{d)}$$

where b would include (the Coulomb law for magnetism), the inverse of the magnetic permeability and the product of the magnetic masses, d is the distance at rest between each pair of magnets.

Figure 11:
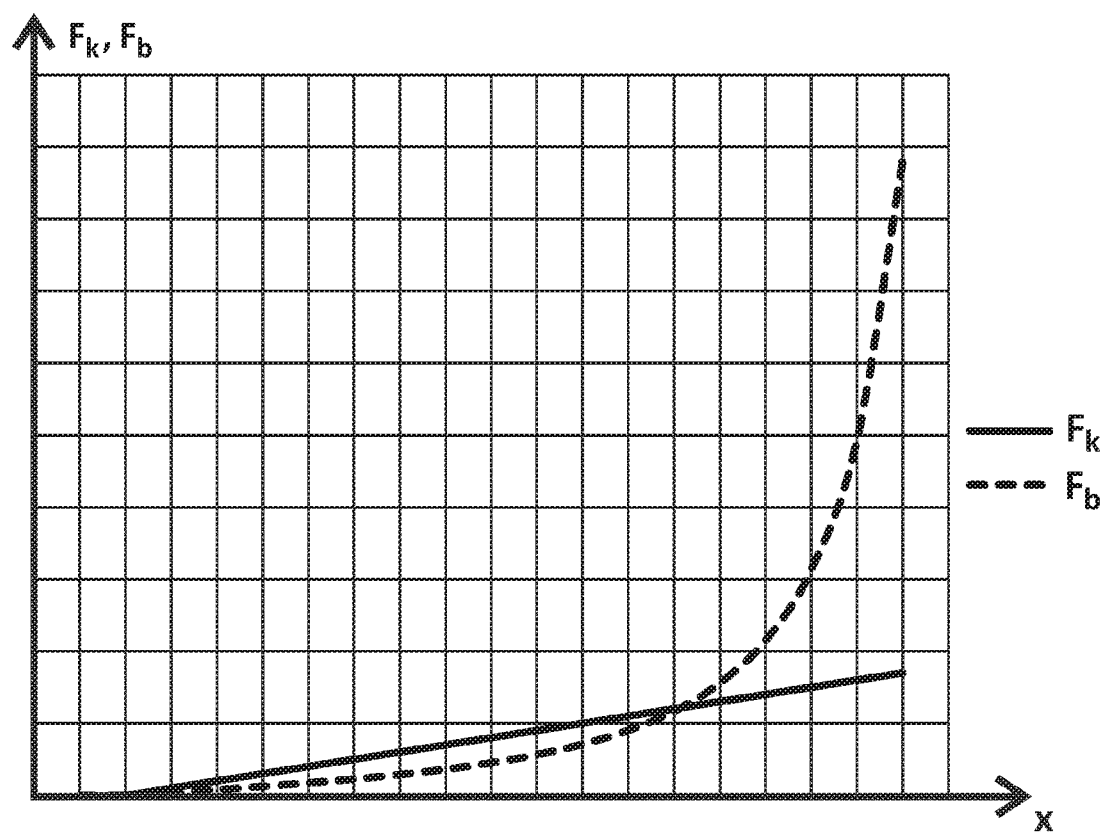
FIG. 11 represents the evolution against displacement (x) of the spring force ($F_k$) and of the magnetic repulsion force ($F_b$)

As shown in FIG. 11, the evolution with the displacement x of the spring force $F_k$ produced on the mass by deformation of the rod and the joint force produced by the two pairs of magnets $F_b$ are very different. As it can be seen and as already mentioned, as the mass (the pole) moves, near its neutral position of zero bending, the spring force is predominant against the magnetic forces. As the displacement increases, its influence begins to equalise and in high displacements, the predominant force is of magnetic origin.

This has several implications.

Figure 12:
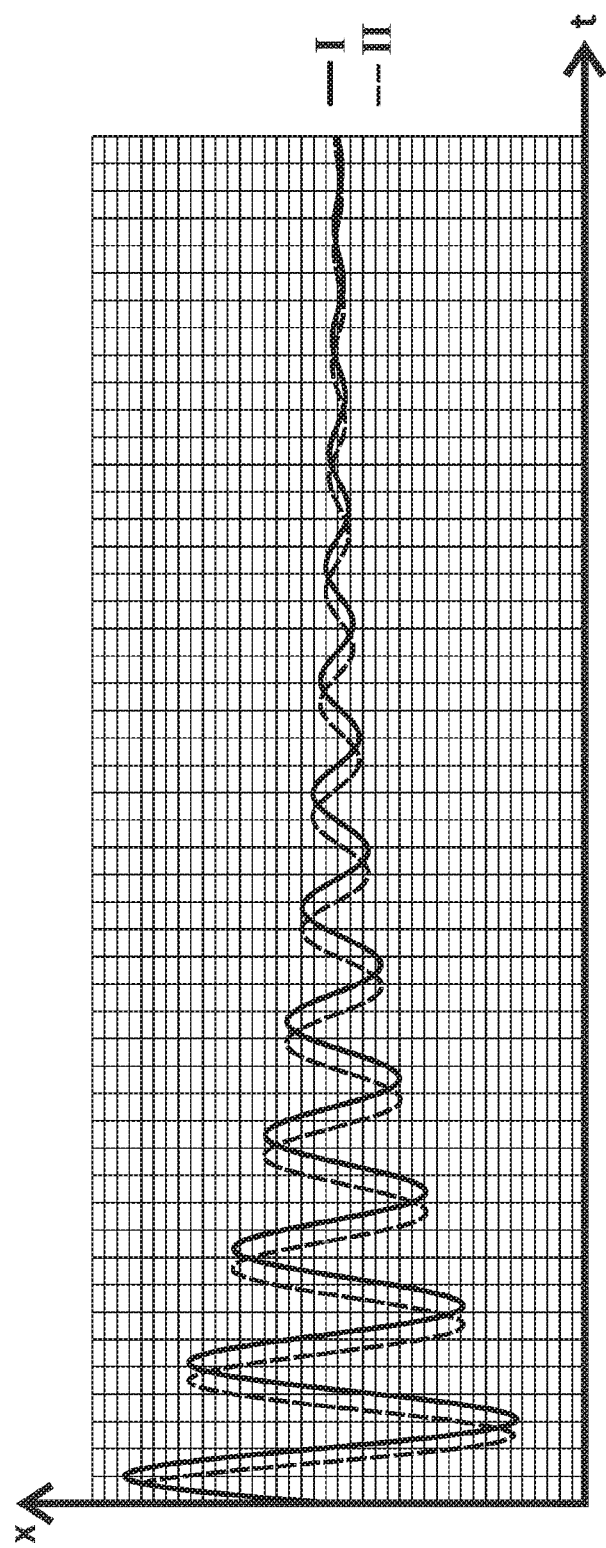
FIG. 12 represents the variation over time of the amplitude (displacement x) and frequency (oscillation along the time axis t) of a device without tuning (I) and a tuned device (II) (movement with magnetic repulsion) when subjected to the action of an instantaneous force in the initial instant.

The kinetic energy of the oscillating pole when it passes through its neutral position of zero bending depends in both cases on the square of its mass and its speed. Not so with the stored potential energy when its displacement is maximum. In the case represented in FIG. 10A, the potential energy is only elastic potential energy and in the case represented in FIG. 10B, the potential energy will have both an elastic and a magnetic nature with the difference that the potential energy of magnetic origin increases with the cube of the displacement and not with the square, as is the case with the elastic potential energy. As shown in FIG. 12, in comparison with the damped simple harmonic movement (I) for large displacements, the trajectory of the movement with magnetic repulsion (II) suffers an increase in its frequency of oscillation. With small displacements (on the right side of the graph), where almost all the potential energy is accumulated by the elastic rod, both trajectories have a very similar size period.

Figure 17:
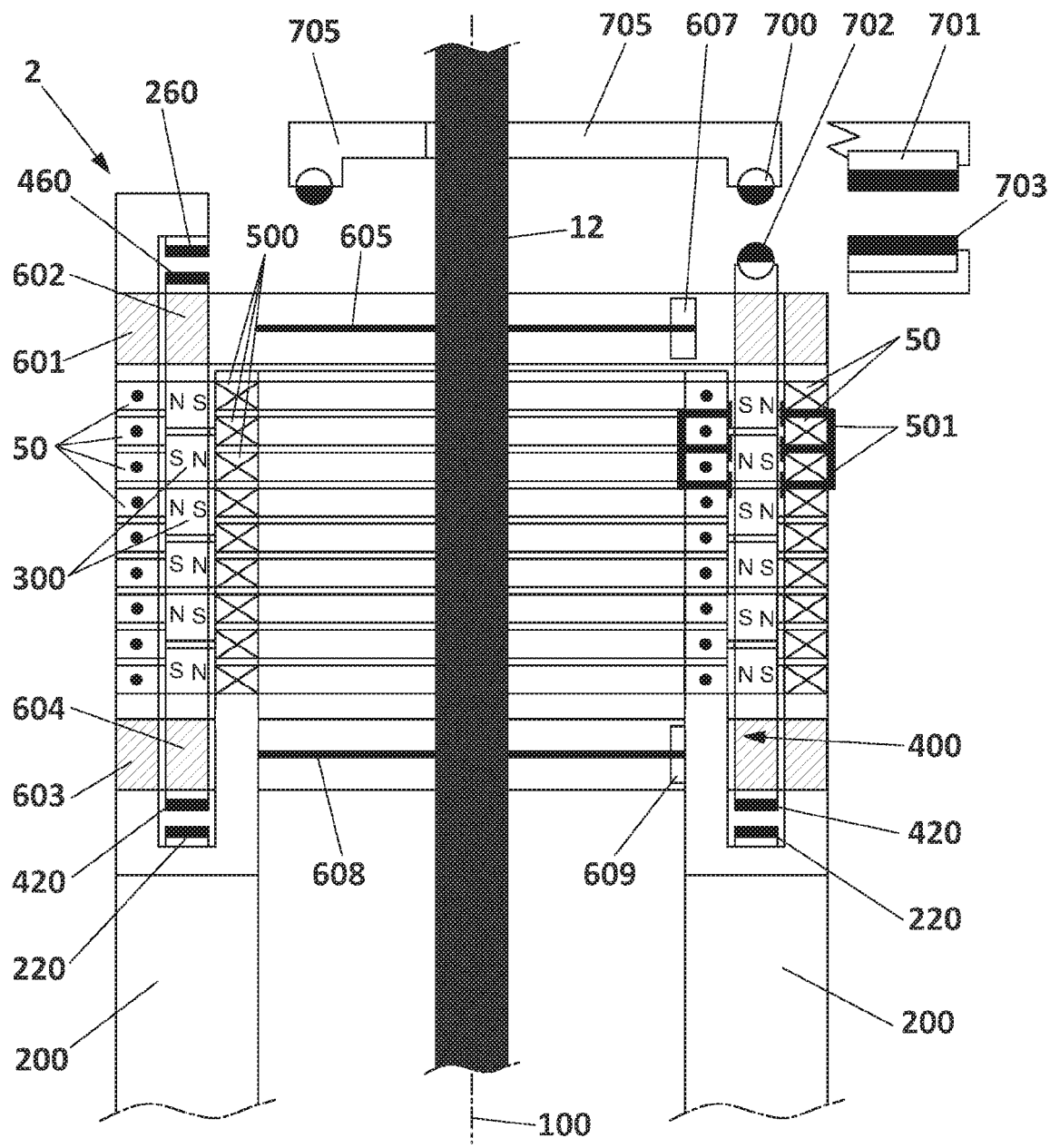
FIG. 17 is a cross sectional side view of a portion of a generator in accordance with an embodiment of the disclosure.

FIG. 17 illustrates a portion of a generator in accordance with another embodiment of the disclosure. Here, the first part can generally be shaped as shown in FIG. 1, and include a flexible part 12. In the embodiment of FIG. 17, this flexible part is surrounded by a generator assembly comprising a stationary first generator module 200 which includes coils 50 and 500, and a second generator module 400 that is moveable in parallel with the longitudinal axis 100 of the first part 1, that is, in this embodiment, in the vertical direction. The second generator module 200 comprises a plurality of magnets 300 stacked on top of each other and arranged in rings, and the first generator module comprises coils 50 surrounding the magnets at the outside of the second generator module 400, and coils 500 surrounded by the magnets 300, within the second generator module 400. The coils can also be provided with iron or ferromagnetic elements schematically illustrated at 501, to concentrate the magnetic field. Movement of the magnets 300 in the vertical direction will generate an electromotive force in the coils, as known in the art.

The second generator module comprises an top annular frame member 602 on top of the magnets 300, and a bottom annular frame member 604 below the magnets. 300 Thus, the second generator module can be regarded as a kind of piston, arranged to move in the vertical direction, between the coils 50 and 500 of the first generator module.

Figure 18:
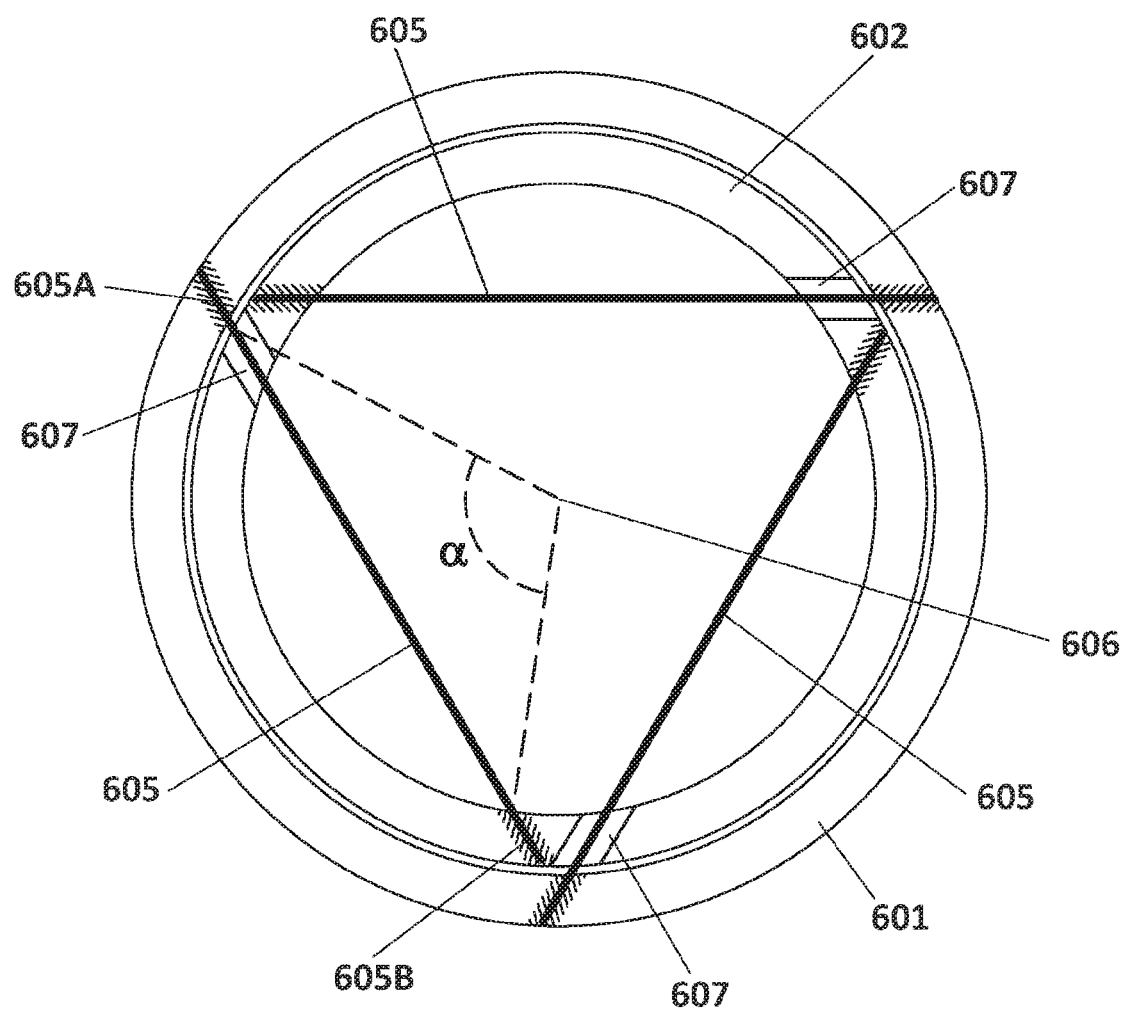
FIG. 18 is a cross sectional top view of a portion of the generator of the embodiment of FIG. 17.

The first generator module likewise comprises two annular frame members 601 and 603. An upper one of said annular frame members 601 is attached to the top annular frame member 602 of the second generator module by rod-shaped elements or connecting members 605 as shown in FIG. 18, whereas the lower annular frame member 603 of the first generator module 200 is attached to the bottom annular frame member 604 of the second generator module by similar rod-shaped members 608. These rod-shaped members can, for example, be of metal, of carbon fibre, or of any other material featuring sufficient traction and fatigue resistance.

FIG. 18 schematically illustrates how the rod members 605 are attached at one end to the annular frame member 601 of the first generator module, and at another end to the annular frame member 602 of the second generator module. Three openings 607 are provided in the annular frame member 602, said opening allowing a corresponding rod-shaped member 605 to pass through the annular frame member 602, said openings having an extension in the vertical direction that allows a displacement in the vertical direction between the rod-shaped member 605 and the annular frame member 602. Similar rod-shaped members 608 and openings 609 are provided in correspondence with the bottom annular frame members 603 and 604.

In FIG. 18 it is schematically illustrated how the points of connection 605A and 605B of the rod-shaped member 605 to the annular frame member 601 and the annular frame member 602, respectively, are separated by an angle α in the horizontal plane, in relation to an axis of symmetry 606 of the second generator module (in this embodiment, this axis of symmetry is aligned with the axis of symmetry 100 of the first part 1). In this case, this angle is approximately 120°. This substantial separation of the attachment points can be advantageous in that it allows for the use of relatively rigid connecting members 605, for example, metal or carbon fibre rods or bars, which can serve to maintain the relative position of the first generator module and the second generator module substantially fixed in the plane perpendicular to the longitudinal axis of the first part, thereby preventing contact between the first generator module and the second generator module, while at the same time allowing for a sufficient amplitude of the movement of the second generator module in relation to the first generator module, in parallel with said longitudinal axis of the first part.

Only three rod-shaped members are shown in FIG. 18, but any other suitable number of rod-shaped members can be used, and the angular placement of the attachment points to the annular frame members can be chosen as preferred by the person skilled in the art.

FIG. 17 shows how the second generator module is suspended or floating in the air, due to the repulsion between a ring of magnets 220 arranged below the second generator module 400, and a ring of magnets 420 arranged at the bottom of the second generator module. Thus, the interaction between these magnets 220 and 420 biases the second generator module upwards, against the force exerted by gravity. On the other hand, in this embodiment of the disclosure, magnets 460 associated to the first generator module and magnets 260 associated to the second generator module 200 at the top of the second generator module, bias the second generator module downwards. In some embodiments of the disclosure, the magnets can be replaced by springs, and/or the magnets are not present at the top of the second generator module, as in some embodiments gravity can serve alone to bias the second generator module downwards.

Figure 19A:
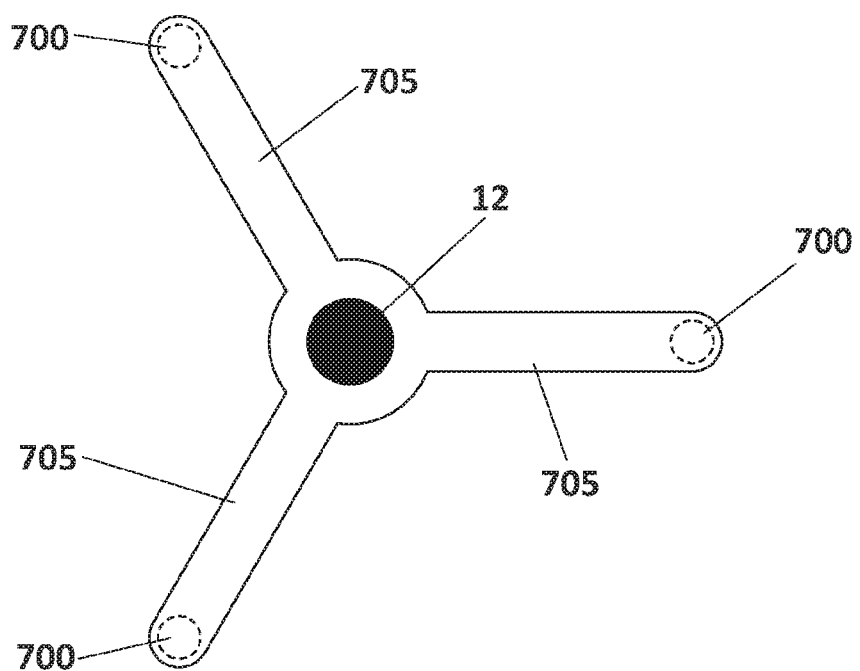
FIGS. 19A and 19B are schematic top views of two alternative magnet assemblies that can be used in the embodiment of FIGS. 17 and 18.
Figure 19B:
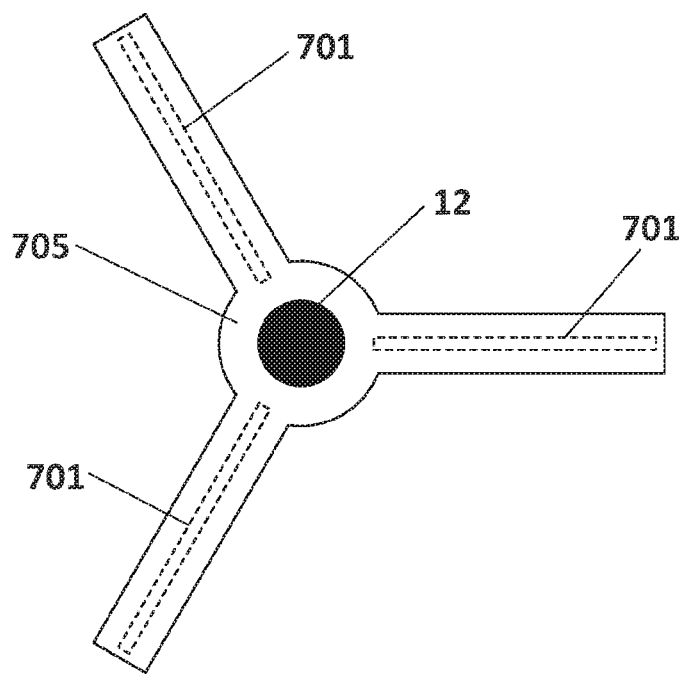

On the other hand, additional magnets 702 or 703 are attached to the second generator module 400 at the top thereof, and arranged to interact with corresponding magnets 700 or 701 attached to the first part, in this case, to the the flexible part 12 of the pole 1. More specifically, these magnets 700 or 701 are arranged on a frame 705 attached to the flexible part 12, the frame comprising a plurality of arms (three arms in the embodiment shown in FIGS. 19A and 19B). In FIG. 19A, spherical or partially spherical magnets 700 are arranged in correspondence with the ends of the arms of the frame. In FIG. 19B an alternative embodiment is shown, with magnets 701 having a strip-like shape in the horizontal plane extending along the arms. In FIG. 17 it is schematically shown how magnets having a corresponding spherical 702 or strip-like 703 shape are arranged at the top of the second generator module 400.

FIG. 17 shows the flexible part 12 in the neutral position, that is, extending vertically along the vertical axis 100. Here, the displacing magnets 700 (or 701) attached to the frame 705 are close to the displaced magnets 702 (or 703) arranged at the top of the second generator module 400, thereby biasing the second generator module downwards. During the oscillating movement of the first part 1 including the flexible part 12, the distance between the displacing magnets 700/701 and the displaced magnets 702/703 will increase and decrease cyclically. On the other hand, the second generator module can, due to the way in which it is suspended due to the interaction between the magnets 220 and 420 (and/or springs) and optionally between the magnets 260 and 460 (and/or springs) and due to gravity, oscillate up and down. During each cycle of oscillation of the first part 1, the interaction between the displacing magnets 700/701 and the displaced magnets 702/703 repetitively provides an impulse to the second generator module 400, thereby transferring energy from the first part 1 to the second generator module 400, which will start to oscillate and continue to oscillate, whereby this oscillation displaces the magnets 300 in relation to the coils 50 and 500, generating electric energy.

It has been found that this arrangement is an appropriate option for the generation of electric energy out of the oscillatory movement of the first part produced by the vortices. Also, the described embodiment can be regarded as especially advantageous in that there is no friction between moving parts, and there are no roller bearings that require lubrication. The use of elements of for example titanium, steel or carbon fibre for physically interconnecting the first generator module and the second generator module can be an appropriate and resistant solution, allowing for long-term operation without the need for replacing parts due to wear, and without any need for lubrication. The fact that the second generator module can be caused to oscillate at a frequency higher than the frequency of oscillation of the first part can be useful to enhance to efficiency of the conversion of the energy represented by the oscillation of the first part, into electrical energy.

The described arrangement of the displaced and the displacing magnets can also be considered especially advantageous, in that the lateral displacement of the displacing magnets can imply that the duration of high repulsive forces between the displacing magnets and the displaced magnets is rather short, whereby the transfer of energy from the first part to the second generator module takes place during a short period, in an impulse-like manner. The oscillation of the second generator module will be determined on the one hand by this impulse, that is, on the energy received from the first part, and by the mass of the second generator module, by the dampening that takes place due to the extraction of electric power from the coils, by the rigidity of the connecting members 105, and by the repulsive forces exerted by the magnets 220/420 and 260/460.

On the other hand, as described above, WO-2012/017106-A1 proposes an increase in pole diameter with height introducing the Hellmann exponential Law according to which the speed of the air increases with height. In this way the vortices might be produced synchronously at all the sections of the pole. However, WO-2012/017106-A1 has not taken into account the variation of the relative velocity of the air against the pole that is due to the very movement of the pole.

The geometry of the pole should be carefully designed such that the generated vortices act synchronously throughout its length, so as to prevent the vortices generated at certain height from being fully or partially cancelled by those generated at a different height. In order for the geometry of the pole to have a proper or optimal performance it is not only necessary to consider the air speed profile in the working area of the device, but it is also necessary to take into account the oscillation of the pole itself, given that the oscillation of the pole affects the relative velocity between air and pole.

As explained above, in many embodiments of the disclosure the pole comprises a rigid element 11, sustained or supported by an elastic rod 12, which in some embodiments of the disclosure may be considered to have a constant cross section and to be longitudinally isotropic. If this is so, the position A (see FIGS. 13A and 13B) of its free top end (i.e., the top end of the area wherein the deformation of the rod is not limited by its embedding in the rigid element) in any of its radial planes X-Y may be calculated in the following way:

$$x = \frac{L}{\theta} \cdot (1 - \cos(\theta)) \qquad \text{e)}$$

$$y = \frac{L}{\theta} \cdot sen(\theta)$$

where L is the length of the deformable area of the rod (i.e., the part of the rod that is not embedded in the base or in the rigid part) and e is the flexed angle with respect to the vertical.

FIGS. 13C and 13D show how a segment AA' with length l may be drawn, with the top end matching the free top end of the elastic rod and with an angle θ with respect to the vertical (see FIG. 13D). The position of A' is given by the following formula:

$$x = \frac{L}{\theta} \cdot (1 - \cos(\theta)) - l \cdot \sin(\theta) \qquad \text{f)}$$

$$y = \frac{L}{\theta} \cdot (sen(\theta)) - l \cdot \cos(\theta)$$

It is possible to observe that, for sufficiently small flexion angles θ, the value of I for the displacement of A' to be minimal during an oscillation of the rod, turns out to be $$l \approx \frac{L}{2}.$$

Figure 14:
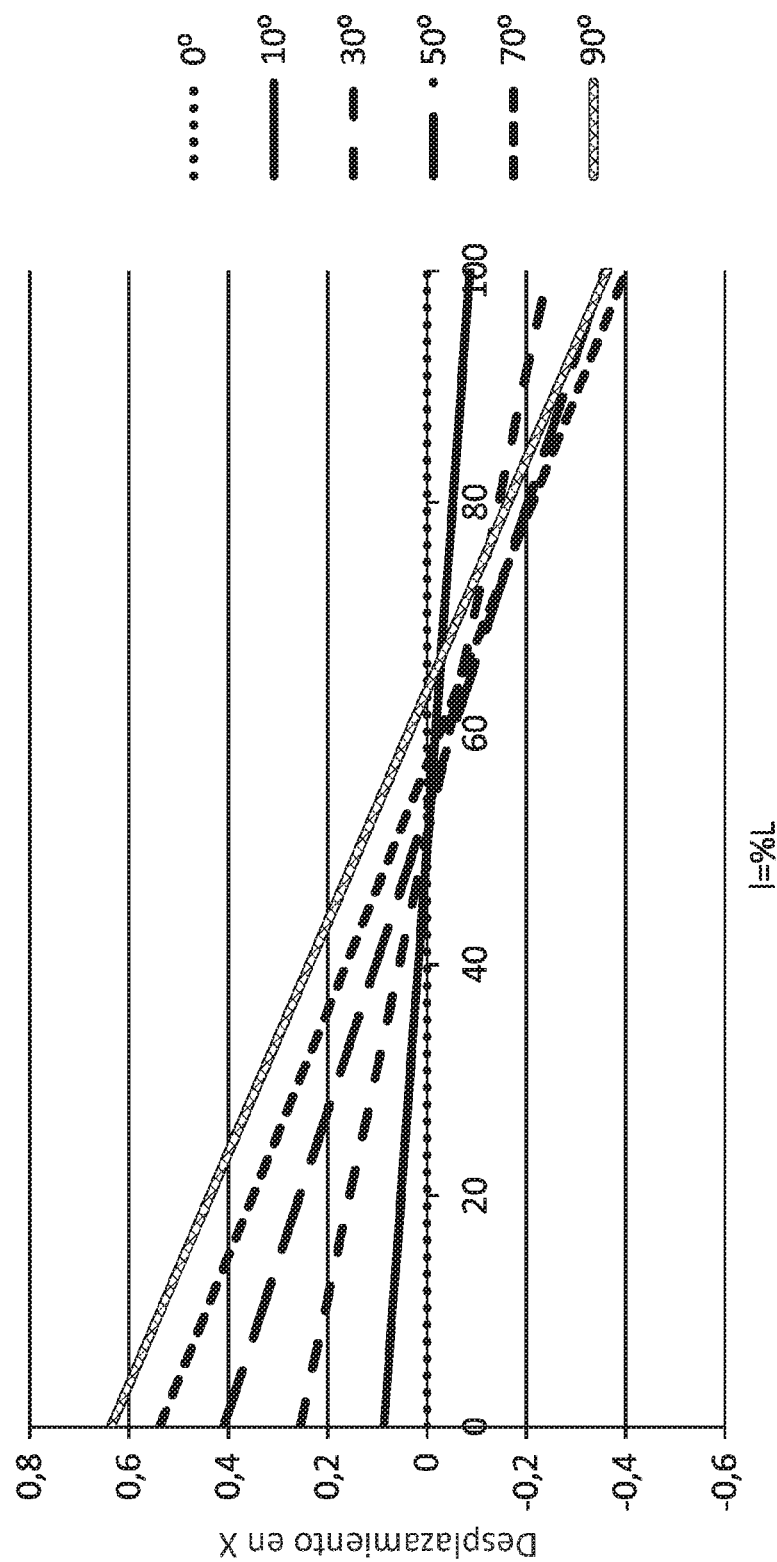
FIG. 14 is a graph showing calculations performed to confirm what has been illustrated in FIGS. 13A-13D for several bending angles, showing that as the angles increase, the assumption of zero displacement is no longer correct.

(see FIG. 14). Given its "immobility" against flexion of this point, the formula of Von Karman can be applied in its position. The diameter d of the pole can be set as a design parameter at the point where its displacement produced by the oscillation is negligible, namely, at half the height of the flexible part of the rod:

$$D\left(\frac{L}{2}\right) = d. \quad \text{g)}$$

$$f\left(\frac{L}{2}\right) = \frac{S \cdot v\left(\frac{L}{2}\right)}{d}$$

In order to be able to generalize this formula for any value of y, it can be assumed that at any height (∀y), in the range of Reynolds in which the device will work, the value of Strouhal is approximately constant and identical to the value it takes when $$y = \frac{L}{2}.$$

It can be set as an objective that the frequency of appearance of vortices remains constant at any height.

$$f(y) = f = \frac{S \cdot v_r(y)}{D(y)} = \text{constant} \quad \text{h)}$$

where $v_r(y)$ is the relative velocity of the air (i) that strikes on the moving pole. This relative velocity has two components, one is the absolute velocity of the air relative to the ground and, the other, the velocity with respect to the pole caused by the oscillation of the same. Obviously, the average velocity of oscillation will be four times the maximum amplitude of oscillation divided by the period (or multiplied by its inverse, the frequency).

$$v_r(y) = (v^2(y) + (4 \cdot X(y) \cdot f)^2)^{\frac{1}{2}} \quad \text{i)}$$

$X(y)$ being the amplitude of the oscillation at each height y. Substituting i) in the equation h) and squaring, the following is obtained:

$$f^2 = \frac{S^2 \cdot (v^2(y) + 16 \cdot X^2(Y) \cdot f^2)}{D(y)^2} \rightarrow f^2 = \frac{S^2 \cdot v^2(y)}{D(y)^2 - 16 \cdot S^2 \cdot X^2(y)} \quad \text{j)}$$

Making it equal to the square of g) the following is obtained:

$$D^2(y) = \frac{d^2 \cdot v^2(y)}{v^2\left(\frac{L}{2}\right)} + 16 \cdot S^2 \cdot X^2(y) \quad \text{k)}$$

For a device of total height H and a "nominal" amplitude of maximum oscillation in its uppermost part of β times its diameter at that point $X(H) = \beta \cdot D(H)$ and taking into account that the pole is considered as completely rigid, the following is obtained:

$$X(y) = \frac{y - \frac{L}{2}}{H - \frac{L}{2}} \cdot \beta \cdot D(H) \rightarrow X(H) = \beta \cdot D(H) \quad \text{l)}$$

Applying this to the equation k) for y=H the following is obtained:

$$D^2(H) = \quad \text{m)}$$

$$\frac{d^2 \cdot v^2(H)}{v^2\left(\frac{L}{2}\right)} + 16 \cdot S^2 \cdot \beta^2 \cdot D^2(H) \rightarrow D^2(H) = \frac{d^2 \cdot v^2(H)}{v^2\left(\frac{L}{2}\right) \cdot (1 - 16 \cdot S^2 \cdot \beta^2)}$$

Combining this with the equations l) and k) the following is obtained:

$$D^2(y) = \frac{d^2}{v^2\left(\frac{L}{2}\right)} \left[ v^2(y) + \frac{16 \cdot S^2 \cdot \beta^2}{(1 - 16 \cdot S^2 \cdot \beta^2)} \cdot \left(\frac{y - \frac{L}{2}}{H - \frac{L}{2}}\right)^2 \cdot v^2(H) \right] \quad \text{n)}$$

Finally $$D(y) = \frac{d}{v\left(\frac{L}{2}\right)} \cdot \left[ v^2(y) + \frac{16 \cdot S^2 \cdot \beta^2}{(1 - 16 \cdot S^2 \cdot \beta^2)} \cdot \left(\frac{y - \frac{L}{2}}{H - \frac{L}{2}}\right)^2 \cdot v^2(H) \right]^{\frac{1}{2}} \quad \text{o)}$$

This expression describes the variation of the characteristic dimension of a pole that generates synchronously and throughout its whole length vortices taking into account the air velocity profile and the own oscillation.

In order to calculate v(y) with $$y = \frac{L}{2},$$

y=H or any other value comprised between 0 and H, expressions that try to represent with different fidelity the distribution of velocities of the air with the height can be introduced. Typically, the Hellmann exponential law can be introduced for neutral atmospheres, the formulation linked to the Monin-Obukhov similarity theory for neutral, stable and unstable atmospheres, etc.

Figure 15:
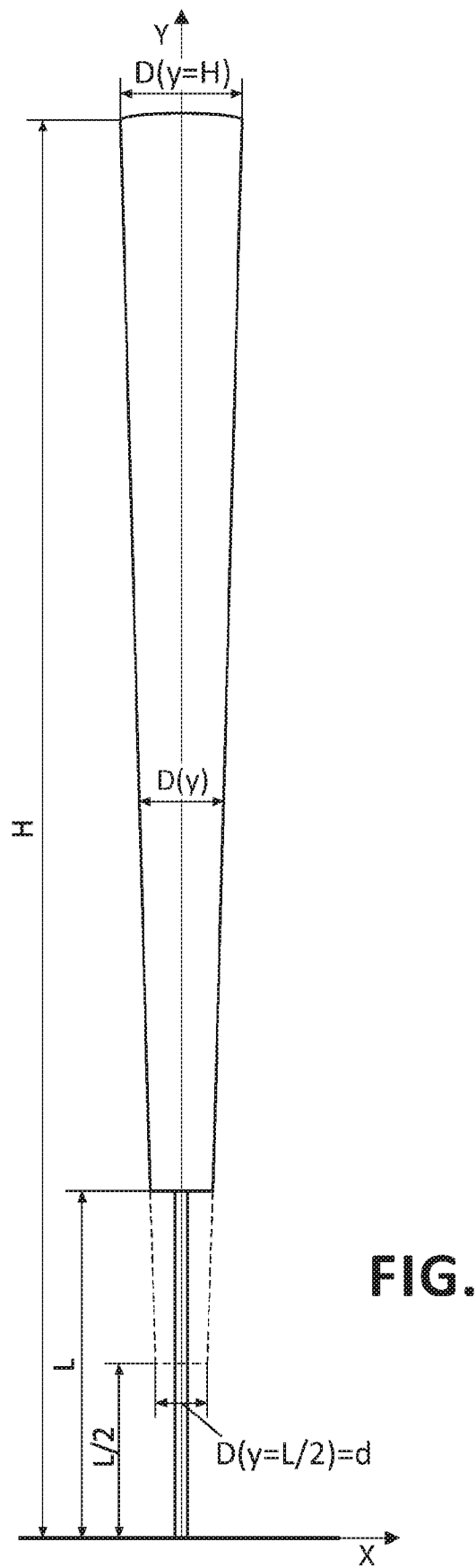
FIG. 15 is a diagram illustrating the evolution with height of the diameter of a pole of height H for a working amplitude at its highest part of $\beta \cdot D(H)$ and a lower diameter d.

FIG. 15 illustrates schematically the evolution with height of the diameter of a pole of height H for a working amplitude at its uppermost part of β·D(H) and a lower diameter d.

The diameter d is a mathematical artefact useful to describe the evolution of diameters (or characteristic dimensions) of the rest of the pole, but it is not necessary for the rigid element of the pole to actually exist as such, physically, at the height $$y = \frac{L}{2}.$$

The expressions "first generator module" and "second generator module" are used for referring to the different parts, such as a stationary part and a moveable part, of the assembly in charge of converting kinetic energy into electrical energy by relative displacement between magnets or similar in relation to coils. The use of the term "module" is not intended to denote a specifically modular character of the generator.

In this text, the term "magnet" generally refers to a permanent magnet, although whenever appropriate also electromagnets may be used, as readily understood by the person skilled in the art.

In this text, the word "comprises" and its variants (such as "comprising", etc.) should not be construed as excluding, that is, they do not exclude the possibility of other elements, steps, etc. from being included in the description.

On the other hand, the disclosure is not limited to the specific embodiments that have been described but it also includes, for example, the variants that can be carried out by the person of average skill in the art (for example, regarding the choice of materials, dimensions, components, configuration, etc.), within what follows from the claims.

The invention claimed is:

1. An electrical power generator, comprising:
a first part having a first terminal end and a second terminal end, the first terminal end being configured to be anchored in an anchoring point, the second end being free such that the first part can perform an oscillating movement, the oscillating movement being a swaying movement of the first part relative to the anchoring point, the first part being configured to be located in a fluid and configured such that, when said fluid moves, vortices in the fluid are generated such that a lift force is generated on the first part, producing the oscillating movement of the first part relative to the anchoring point, wherein said oscillating movement has an amplitude that varies according to a velocity of said fluid;
a second part that surrounds, at least partially, said first part;
a system having at least one first magnet attached to the first part and at least one second magnet attached to the second part, the system configured to generate a magnetic field between the at least one first magnet and the at least one second magnet that produces a magnetic repulsion force between the first part and the second part, wherein the at least one first magnet is arranged at a distance from said at least one second magnet such that the distance varies with the oscillating movement, wherein the magnetic repulsion force generated by the at least one first magnet and the at least one second magnet, varies with the oscillating movement of the first part due to variation of the distance between the at least one first magnet and the at least one second magnet, such that an amplitude of the magnetic repulsion force increases when the amplitude of the oscillating movement of the first part increases; and
a subsystem of magnets configured to induce electrical current in at least one coil, the generator being configured such that the oscillating movement of the first part produces a relative displacement between the subsystem of magnets and the at least one coil, such that an electromotive force is generated in said at least one coil.

2. The generator according to claim 1, wherein said at least one first magnet comprises at least two diametrically opposed parts, and wherein said at least one second magnet comprises at least two diametrically opposed parts facing said at least two diametrically opposed parts of said at least one first magnet, wherein said at least one first magnet is configured as at least one ring.

3. The generator according to claim 2, wherein said at least one second magnet is configured as at least one ring.

4. The generator according to claim 1, wherein said at least one first magnet comprises a plurality of magnets arranged at different heights above a base of the generator and wherein said at least one second magnet comprises a plurality of magnets arranged at different heights above the base of the generator.

5. The generator according to claim 1,
wherein said at least one first magnet comprises a first plurality of magnets arranged substantially adjacent to each other and with polarities arranged so that the magnetic field produced by said first plurality of magnets is stronger on a first side of said first plurality of magnets facing said at least one second magnet than on a second side, or
wherein said at least one second magnet comprises a second plurality of magnets arranged substantially adjacent to each other and with polarities arranged so that the magnetic field produced by said second plurality of magnets is stronger on a first side of said second plurality of magnets facing said at least one first magnet than on a second side.

6. The generator according to claim 1, wherein the at least one first magnet and the at least one second magnet are arranged in an inclined manner in relation to a longitudinal axis of the first part.

7. The generator according to claim 1, wherein the first part is configured such that the amplitude of the oscillating movement increases when the velocity of the fluid increases, at least within a certain range of velocities.

8. The generator according to claim 1, wherein the subsystem of magnets comprises the at least one first magnet.

9. The generator according to claim 1, wherein the subsystem of magnets comprises a plurality of magnets arranged such that when the first part moves during the oscillating movement of the first part from a neutral position to an extreme tilted position, said at least one coil is subjected to at least one change of direction of the magnetic field.

10. The generator according to claim 1, the at least one coil being arranged on the second part and the subsystem of magnets being arranged on the first part.

11. The generator according to claim 1, further comprising a generator subsystem comprising a first generator module and a second generator module, wherein said second generator module moves in relation to said first generator module and in parallel with a longitudinal axis of the first part, such that the movement produces the relative displacement between the subsystem of magnets and the at least one coil.

12. The generator according to claim 11, wherein the generator is configured such that as a result of the oscillating movement of the first part, an oscillating movement of the second generator module is produced, the oscillating movement of the second generator module being in a direction parallel with the longitudinal axis of the first part and having a frequency higher than a frequency of the oscillating movement of the first part.

13. The generator according to claim 1, wherein the second part comprises a first generator module and a second generator module, wherein the second generator module moves in relation to the first generator module such that the movement produces the relative displacement between the subsystem of magnets and the at least one coil, wherein the second generator module is suspended to oscillate in relation to the first generator module, at a frequency different from a frequency of the oscillating movement of the first part.

14. The generator according to claim 1, wherein the first part comprises an oscillating pole and wherein the second part comprises a static structure located in correspondence with a base of the oscillating pole.

15. The generator according to claim 1, wherein the first part comprises a substantially rigid part at the second terminal end and a substantially flexible part at the first terminal end, such that, given the flexibility of the substantially flexible part, the first part can perform the oscillating movement relative to the anchoring point.

16. A method for making an electrical power generator, the generator comprising:
- a first part having a first terminal end and a second terminal end, the first terminal end being anchored to an anchoring point and the second terminal end being free, the first part being configured to be located in a fluid and configured such that when said fluid moves, vortices in said fluid are generated such that a lift force is generated on the first part, producing an oscillating movement of the first part relative to the anchoring point,
- a second part that surrounds, at least partially, said first part; and
- a subsystem of magnets configured to induce electrical current in at least one coil, the generator being configured such that the oscillating movement of the first part produces a relative displacement between the subsystem of magnets and the at least one coil, such that an electromotive force is generated in said at least one coil, the method comprising the step of arranging at least one first magnet on the first part and at least one second magnet on the second part, such that said at least one first magnet and said at least one second magnet repel each other with a magnetic repulsion force, wherein the at least one first magnet is arranged at a distance from said at least one second magnet such that the distance varies with the oscillating movement, wherein the magnetic repulsion force generated by the at least one first magnet and the at least one second magnet, varies with the oscillating movement of the first part due to variation of the distance between the at least one first magnet and the at least one second magnet, such that an amplitude of the magnetic repulsion force increases when the amplitude of the oscillating movement of the first part increases.

\* \* \* \* \*